(12) United States Patent
Gilmour et al.

(10) Patent No.: US 8,543,649 B2
(45) Date of Patent: Sep. 24, 2013

(54) METHOD AND APPARATUS FOR CONSTRUCTING AND MAINTAINING A USER KNOWLEDGE PROFILE

(75) Inventors: David L. Gilmour, Los Altos Hills, CA (US); Eric Wang, Milpitas, CA (US)

(73) Assignee: Oracle International Corporation, Redwood Shores, CA (US)

(*) Notice: Subject to any disclaimer, the term of this patent is extended or adjusted under 35 U.S.C. 154(b) by 80 days.

(21) Appl. No.: 10/135,254

(22) Filed: Apr. 29, 2002

(65) Prior Publication Data

US 2002/0194178 A1    Dec. 19, 2002

Related U.S. Application Data

(63) Continuation of application No. 09/614,943, filed on Jul. 12, 2000, now Pat. No. 6,421,669, which is a continuation-in-part of application No. 09/157,092, filed on Sep. 18, 1998, now Pat. No. 6,115,709.

(51) Int. Cl.
*G06F 15/16* (2006.01)
(52) U.S. Cl.
USPC ............................ 709/206; 707/754; 707/783
(58) Field of Classification Search
USPC ................... 707/1, 3, 4, 10, 5, 9, 6, 754, 783; 709/206
See application file for complete search history.

(56) References Cited

U.S. PATENT DOCUMENTS

| | | |
|---|---|---|
| 4,914,586 A | 4/1990 | Swinehart et al. |
| 4,970,681 A | 11/1990 | Bennett |
| 5,051,891 A | 9/1991 | MacPhail |
| 5,093,918 A | 3/1992 | Heyen et al. |
| 5,247,575 A | 9/1993 | Sprague et al. |

(Continued)

FOREIGN PATENT DOCUMENTS

| | | |
|---|---|---|
| EP | 0 751 471 A1 | 1/1997 |
| EP | 1 121 650 A1 | 8/2001 |

(Continued)

OTHER PUBLICATIONS

"A Multi-Agent Referral System for Matchmaking", Leonard N. Foner, The First International Conference on the Practical Applications of Intelligent Agents and Multi-Agent Technology, London UK, Apr. 1006.

(Continued)

*Primary Examiner* — Cam Truong
(74) *Attorney, Agent, or Firm* — Kilpatrick, Townsend & Stockton

(57) ABSTRACT

A method of constructing an entity profile, having private and public portions with different access restrictions, commences with the assignment of a confidence level to content within an electronic document. The electronic document may be associated with the first entity (e.g., may have been authored by or addressed to the first entity). The content may furthermore potentially be descriptive of the first entity. If the confidence level assigned to the content is less than a predetermined threshold, the content is automatically rejected for inclusion within the entity profile. On the other hand, if the confidence level assigned to the content exceeds the predetermined threshold, the content is included within the private portion of the entity profile. Thereafter, the content is automatically presented to the first entity for authorization, by the first entity, for inclusion of the content within the public portion of the profile. The public portion of the entity profile may be freely accessible by other entities, whereas the private portion may have access restrictions.

24 Claims, 32 Drawing Sheets

(56) References Cited

U.S. PATENT DOCUMENTS

| | | | |
|---|---|---|---|
| 5,247,661 A | 9/1993 | Hager et al. | |
| 5,251,131 A | 10/1993 | Masand et al. | |
| 5,251,159 A | 10/1993 | Rowson | |
| 5,276,869 A | 1/1994 | Forrest et al. | |
| 5,297,057 A | 3/1994 | Kramer et al. | |
| 5,331,579 A | 7/1994 | Maguire, Jr. et al. | |
| 5,333,237 A | 7/1994 | Stefanopoulos et al. | |
| 5,428,740 A | 6/1995 | Wood et al. | |
| 5,428,778 A | 6/1995 | Brookes | |
| 5,438,526 A | 8/1995 | Itoh et al. | |
| 5,442,778 A | 8/1995 | Petersen et al. | |
| 5,446,891 A | 8/1995 | Kaplan et al. | |
| 5,473,732 A | 12/1995 | Chang | |
| 5,481,741 A | 1/1996 | McKaskle et al. | |
| 5,483,650 A | 1/1996 | Pedersen et al. | |
| 5,488,725 A | 1/1996 | Turtle et al. | |
| 5,493,729 A | 2/1996 | Nigawara et al. | |
| 5,513,126 A | 4/1996 | Harkins et al. | |
| 5,530,852 A | 6/1996 | Meske, Jr. et al. | |
| 5,541,836 A | 7/1996 | Church et al. | |
| 5,544,067 A | 8/1996 | Rostoker et al. | |
| 5,555,426 A | 9/1996 | Johnson et al. | |
| 5,586,218 A | 12/1996 | Allen | |
| 5,608,900 A | 3/1997 | Dockter et al. | |
| 5,619,648 A * | 4/1997 | Canale et al. | 709/206 |
| 5,628,011 A | 5/1997 | Ahamed et al. | |
| 5,659,731 A | 8/1997 | Gustafson | |
| 5,659,732 A | 8/1997 | Kirsch | |
| 5,664,115 A | 9/1997 | Fraser | |
| 5,692,107 A | 11/1997 | Simoudis et al. | |
| 5,696,965 A | 12/1997 | Dedrick | |
| 5,704,017 A | 12/1997 | Heckerman et al. | |
| 5,717,914 A | 2/1998 | Husick et al. | |
| 5,717,923 A * | 2/1998 | Dedrick | 707/102 |
| 5,720,001 A | 2/1998 | Nguyen | |
| 5,724,567 A | 3/1998 | Rose et al. | |
| 5,727,129 A | 3/1998 | Barrett et al. | |
| 5,754,938 A | 5/1998 | Herz et al. | |
| 5,754,939 A | 5/1998 | Herz et al. | |
| 5,768,508 A | 6/1998 | Eikeland | |
| 5,778,364 A | 7/1998 | Nelson | |
| 5,794,210 A | 8/1998 | Goldhaber et al. | |
| 5,796,948 A * | 8/1998 | Cohen | 709/206 |
| 5,801,700 A * | 9/1998 | Ferguson | 715/748 |
| 5,802,320 A * | 9/1998 | Baehr et al. | 709/249 |
| 5,802,518 A | 9/1998 | Karaev et al. | |
| 5,809,297 A * | 9/1998 | Kroenke et al. | 707/102 |
| 5,812,434 A | 9/1998 | Nagase et al. | |
| 5,835,087 A | 11/1998 | Herz et al. | |
| 5,855,008 A | 12/1998 | Goldhaber et al. | |
| 5,867,799 A | 2/1999 | Lang et al. | |
| 5,872,850 A | 2/1999 | Klein et al. | |
| 5,892,909 A | 4/1999 | Grasso et al. | |
| 5,899,981 A | 5/1999 | Taylor et al. | |
| 5,907,677 A | 5/1999 | Glenn et al. | |
| 5,907,836 A | 5/1999 | Sumita et al. | |
| 5,913,210 A * | 6/1999 | Call | 707/4 |
| 5,913,212 A | 6/1999 | Sutcliffe et al. | |
| 5,924,090 A | 7/1999 | Krellstein | |
| 5,924,108 A | 7/1999 | Fein et al. | |
| 5,931,907 A | 8/1999 | Davies et al. | |
| 5,950,200 A | 9/1999 | Sudal et al. | |
| 5,974,412 A | 10/1999 | Hazlehurst et al. | |
| 5,995,597 A | 11/1999 | Woltz et al. | |
| 5,995,943 A | 11/1999 | Bull et al. | |
| 5,999,932 A | 12/1999 | Paul | |
| 5,999,975 A | 12/1999 | Kitteka et al. | |
| 6,005,597 A * | 12/1999 | Barrett et al. | 725/46 |
| 6,006,200 A | 12/1999 | Boles et al. | |
| 6,006,221 A | 12/1999 | Liddy et al. | |
| 6,009,410 A | 12/1999 | LeMole et al. | |
| 6,014,644 A | 1/2000 | Erickson | |
| 6,021,439 A | 2/2000 | Turek et al. | |
| 6,023,762 A | 2/2000 | Dean et al. | |
| 6,026,374 A | 2/2000 | Chess | |
| 6,029,195 A | 2/2000 | Herz | |
| 6,038,560 A | 3/2000 | Wical | |
| 6,044,205 A | 3/2000 | Reed et al. | |
| 6,044,376 A | 3/2000 | Kurtzman, II | |
| 6,049,797 A | 4/2000 | Guha et al. | |
| 6,052,122 A | 4/2000 | Sutcliffe et al. | |
| 6,052,709 A | 4/2000 | Paul | |
| 6,052,714 A | 4/2000 | Miike et al. | |
| 6,061,681 A * | 5/2000 | Collins | 707/5 |
| 6,064,980 A | 5/2000 | Jacobi et al. | |
| 6,094,652 A | 7/2000 | Faisal | |
| 6,105,023 A | 8/2000 | Callan | |
| 6,112,186 A | 8/2000 | Bergh et al. | |
| 6,115,709 A | 9/2000 | Gilmour et al. | |
| 6,119,167 A | 9/2000 | Boyle | |
| 6,151,600 A | 11/2000 | Dedrick | |
| 6,154,783 A | 11/2000 | Gilmour et al. | |
| 6,161,139 A | 12/2000 | Win et al. | |
| 6,175,831 B1 | 1/2001 | Weinreich et al. | |
| 6,182,067 B1 * | 1/2001 | Presnell et al. | 707/5 |
| 6,182,131 B1 | 1/2001 | Dean et al. | |
| 6,195,660 B1 | 2/2001 | Polnerow et al. | |
| 6,199,077 B1 * | 3/2001 | Inala et al. | 715/501.1 |
| 6,205,456 B1 | 3/2001 | Nakao | |
| 6,205,472 B1 | 3/2001 | Gilmour | |
| 6,230,189 B1 | 5/2001 | Sato et al. | |
| 6,233,590 B1 | 5/2001 | Shaw et al. | |
| 6,253,202 B1 | 6/2001 | Gilmour | |
| 6,253,216 B1 * | 6/2001 | Sutcliffe et al. | 715/500 |
| 6,269,369 B1 * | 7/2001 | Robertson | 707/10 |
| 6,292,769 B1 | 9/2001 | Flanagan et al. | |
| 6,298,348 B1 | 10/2001 | Eldering | |
| 6,327,590 B1 | 12/2001 | Chidlovskii et al. | |
| 6,330,610 B1 | 12/2001 | Docter et al. | |
| 6,353,827 B1 | 3/2002 | Davies et al. | |
| 6,360,227 B1 | 3/2002 | Aggarwal et al. | |
| 6,374,237 B1 * | 4/2002 | Reese | 707/3 |
| 6,377,949 B1 | 4/2002 | Gilmour | |
| 6,397,233 B1 | 5/2002 | Okawa et al. | |
| 6,404,762 B1 | 6/2002 | Luzeski et al. | |
| 6,405,197 B2 | 6/2002 | Gilmour | |
| 6,405,243 B1 * | 6/2002 | Nielsen | 709/206 |
| 6,415,283 B1 | 7/2002 | Conklin | |
| 6,421,669 B1 | 7/2002 | Gilmour et al. | |
| 6,434,607 B1 | 8/2002 | Haverstock et al. | |
| 6,460,036 B1 | 10/2002 | Herz | |
| 6,499,682 B1 | 12/2002 | Toorians | |
| 6,571,245 B2 * | 5/2003 | Huang et al. | 707/10 |
| 6,629,097 B1 | 9/2003 | Keith | |
| 6,640,229 B1 | 10/2003 | Gilmour et al. | |
| 6,647,384 B2 | 11/2003 | Gilmour | |
| 6,651,039 B1 | 11/2003 | Ikuta et al. | |
| 6,651,253 B2 | 11/2003 | Dudkiewicz et al. | |
| 6,675,299 B2 | 1/2004 | Porter et al. | |
| 6,711,570 B1 | 3/2004 | Goldberg et al. | |
| 6,711,585 B1 | 3/2004 | Copperman et al. | |
| 6,732,358 B1 * | 5/2004 | Siefert | 717/173 |
| 6,820,204 B1 | 11/2004 | Desai et al. | |
| 6,832,224 B2 | 12/2004 | Gilmour | |
| 6,901,394 B2 | 5/2005 | Chauhan et al. | |
| 6,970,879 B1 | 11/2005 | Gilmour | |
| 7,203,725 B1 | 4/2007 | Gilmour et al. | |
| 7,801,917 B2 | 9/2010 | Gilmour et al. | |
| 7,814,121 B2 | 10/2010 | Gilmour et al. | |
| 2001/0013029 A1 | 8/2001 | Gilmour | |
| 2001/0047276 A1 | 11/2001 | Eisenhart | |
| 2002/0078050 A1 | 6/2002 | Gilmour | |
| 2002/0165861 A1 | 11/2002 | Gilmour | |
| 2005/0004874 A1 | 1/2005 | Gilmour et al. | |
| 2007/0112845 A1 | 5/2007 | Gilmour et al. | |

FOREIGN PATENT DOCUMENTS

| | | |
|---|---|---|
| WO | WO 96/23265 | 8/1996 |
| WO | WO 97/02537 A1 | 1/1997 |
| WO | WO 98/04061 A | 1/1998 |
| WO | WO 98/40832 A2 | 9/1998 |
| WO | WO 99/39279 A1 | 8/1999 |
| WO | PCT/US99/19949 | 12/1999 |
| WO | 00/17781 A1 | 3/2000 |

OTHER PUBLICATIONS

"A Security Policy Model for Clinical Information Systems", Ross J. Anderson, Security and Privacy, 1996, Proceeding IEEE Symposium, May 6-8, 1996, pp. 30-43.

"A Short Introduction to NPtool", Atro Voutilainen, A Short Introduction to NPtool, http://www.lingsoft.fl/doc/nptool/intro/.

"Abuzz's Mission", Abuzz—The Company Mission, http://www.abuzz.com/home/company.htm.

"Always Thinking Ahead", Natrificial Software Technologies, http://www.natrificial.com/Company/about.html.

"Applying Evolutionary Algorithms to the Problem of Information Filtering", Tjoa et al., Proceedings of the 8th international Workshop on Database and Expert System, Sep. 1-2, 1997, pp. 450-456.

"AskSam for Windows Getting Started Guide", (from Software Patent institute Database of Software Technologies), first section, May 30, 1995, serial No. ASKSMGSG.0002.

Autonomy Agentware Technology White Paper, http://www.agentware.com.

Autonomy Knowledge Management Products, http://www.agentware.com.

Autonomy Knowledge Server Data Sheet, http://www.agentware.com.

Autonomy Knowledge Update Data Sheet, http://www.agentware.com.

Autonomy Latest News, Autonomy Home Page, http://www.agentware.com.

"Autonomy Launches New Knowledge Management Products to Help Companies Leverage Employee Expertise, Late-Breaking News and Existing Information Archives", Autonomy Press Release, Feb. 17, 1998, http://www.agentware.com.

"Autonomy Ships Agentware Products for Knowledge Management", Autonomy Press Release, Apr. 14, 1998, http://www.agentware.com.

Welcome to enonymous.com, Web page, "Be Privacy Aware . . . . Be enonymous", http://www.enonymous.com/default.asp.

"Beehive", Abuzz—Beehive, http://www.abuzz.com/home/Beehive.htm.

"Beehive", Abuzz—Beehive Benefits, http://www.abuzz.com/home/benefits.htm.

"Beehive: Beta Program", Abuzz—Beehive Beta Program, http://www.abuzz.com/home/demos.htm.

"Beehive: White Papers", Abuzz—Beehive White Papers, http://www.abuzz.com/home/white_papers.htm.

"Clustering and Information Sharing in an Ecology of Cooperating Agents", Leonard N. Foner, AAAI Workshop on Information Gathering In Distributed, Heterogenous Environments '95, Palo Alto, CA. 1995.

Data Sources, Telecomm Software, Software, First Edition, 1998.

Natrificial: The Brain, "Digitize Your Mind", Natrificial Software Technologies, http://www.natrificial.com/Brain/index.html.

"Distributing PeCo-Mediator: Finding Partners via Personal Connections," IEEE International Conference on Systems, Man, and Cybermatics, 1996, vol. 1, pp. 802-807, Oct. 14-17, 1996.

E-Genie by Open Sesame: Your Entertainment Genlal, http://egenie.opensesame.com/.

Emailrobot for Exchange / SMTP, http://www.email-software.com/pages/00108.htm, review of "Emailrobot for Exchange/SMTP".

"EZ Reader: Embedded A1 for Automatic Electronic Mail interpretation and Routing", Proceedings of the Thirteenth National Conference on Artificial Intelligence and the Eighth Innovative Applications of Artificial Intelligence Conference, A, Rice, J. Hsu, A. Angotti and R. Piccolo, vol. 2, pp. 1507-1517, Aug. 4-8, 1996 (INSPEC Abstract).

Natrificial: The Brain : Info, "Free Your Mind", Natrificial Software Technologies, http://www.natrificial.com/Brain/info_04.html.

Enonymous: New users: technical support: frequently asked questions, Enonymous Web Page, "Frequently Asked Questions", http://www.enonymous.com/faq.asp.

Enonymous: New users: how it works, Enonymous Web Page, "How enonymous advisor beta works . . . .", http://www.enonymous.com/howitworks.asp.

"Information Management for Knowledge Amplification In Virtual Enterprises", J. Numata et al., IEMC Proceedings. pp. 281-285, Aug. 18-20, 1996 (INSEC Abstract).

Integrator's choice awards—Network VAR's top picks in.network hardware and software for 1997, Brambert, Dave; Biangl, Susan—Network VAR V5.n10 p. 28 Oct. 1997.

"IS Puts Notes to the Test", Datamation, Mark Schlack, vol. 37, No. 15, pp. 24-26, Aug. 1, 1991.

Natrificial: The Brain : Info, "It's Your Thought That Counts", Natrificial Software Technologies, http://www.natrificial.com/Brain/info/html.

CMP.not—The Technology Network, "Knowing What We Know", Justin Hibbard, CPM not Information Week On Line, Oct. 20, 1997.

Natrificial: The Brain: Info, "Knowledge is Power", Natrificial Software Technologies, http://www.natrificial.com/Brain/Info_02.html.

CMP.net—The Technology Network , "Knowledge Management Evaluation Scenario", Jeff Angus with Jeetu Patel and Joe Fenner, CPM net Information Week On Line, Mar. 16, 1998.

CMP,net—The Technology Network , "Knowledge Management Takes Industry's Center Stage", Elliot Malse, CMP net Computer Reseller News, Feb. 2, 1998, Issue 774.

CMP.net—The Technology Network ,"Knowledge Management: Fuel for Innovation", Bob Evans, CPM net Information Week On Line, Oct. 20,1997.

CMP.net—The Technology Network , "Knowledge Management: Great Concept . . . . But What Is It?", Jeff Angus, Jeetu Patel and Jennifer Harty, CMP net, Information Week On Line, Mar. 16, 1998.

ZDNet, "Knowledge Management's Net Gain", Kevin Jones, ZD net, Inter@active Week, Feb. 24, 1998.

ZDNet, "Learn Sesame gets more personal", Jim Rapoza, PC Week Online, http://www.zdnet.com/pcweek/reviews/0316/16sesame.html, Mar. 18, 1998.

Forbes, "Life Span vs Life Spam", George Gilder, Forbes ASAP, http://www.forbes.com/asap, Apr. 6, 1998.

"MAIL-MAN; A Knowledge-Based Mail Assistant for Managers", Journal of Organizational Computing, L.F. Motiwalla and J.F. Nunamaker, Jr., vol. 2. No. 2, pp. 131-154, 1992 (abstract only).

Natrificial: Company: Press, "Natrificial Software Technologies Introduces The Brain" (press release), Natrificial Software Technologies, http://www.natrificial.com/Company/press_00.html, Jan. 26, 1998.

Natrificial: Company: Press, "Natrificial Software Technologies Unveils Internet Brain Publishing" (press release), Natrificial Software Technologies, http://www.natrificial.com/Company/press_01.html, Jun. 9, 1998.

Natrificial: Company, "Natrificial Software Technologies", Natrificial Software Technologies, http://www.natrificial.com/Company/Index.html.

CMP.net—The Technology Network , "Neural Agent Enables Personalized Surfing", R. Colin Johnson, CMP net TechWeb, http://www.techweb.com, Feb. 4, 1998.

Open Sesame, "New eCommerce and Entertainment Web Site Demonstrates Leading Edge Personalization and Privacy Features" (press release), http://www.opensesame.com, Jan. 20, 1998.

NPtool Intro: Conclusion and Acknowledgements, http://www.lingsoft.fi/doc/nptool/intro/conculsion.html.

NPtool Intro: NPtool In Outline, http://www.lingsoft/fi/doc/nptool/intro/outline.html.

NPtool Intro: Overview, http://www.lingsoft.fi/doc/nptool/intro/overview.html.

NPtool Intro: Performance, http://www.lingsoft/fi/doc/nptool/intro/performance.html.

NPtool Intro: Previous Work, http://www.lingsoft/fi/doc/nptool/intro/previous.html.

NPtool Intro: Syntactic Description, http://www.lingoft.fi/doc/nptool/intro/syntax.html.

NPtool Intro: Uses of a Noun Phrase Parser, http://www.lingsoft.fi/doc/nptool/intro/uses.html.

Open Sesame—Behold the Power of Personalization, "Open Sesame", http://www.opensesame.com.

KMWorld—Solutions for Business Performance Improvement, "Open Sesame and Verity Open Doors to Personalized Software", KMWorld.com, http://www.kmworld.com, Feb. 6, 1998.

Open Sesame—The Company: Technical Publications, Open Sesame Published Papers, http://www.opensesame.com/co_02.html.
Open Sesame—"Open Sesame Site Just Works", Bill Burke, BusinessToday.com, http://www.opensesame.com, Today's Column, Jan. 22, 1998.
Open Sesame—The Company: Agent Sourcebook, Agent Sourcebook, http://www.opensesame.com/co_03.html.
Open Sesame—Commitment to Privacy, Privacy, http://www.opensesame.com/privacy.html.
Open Sesame—Press, http://opensesame.com/press.cfm.
Open Sesame—Press, Reviews, http://www.opensesame.com/pr_02.html.
Open Sesame—Products, Demos, http://www.opensesame.com/product_05.html.
Open Sesame—Products, Benefits, http://www.opensesame.com/prod_02.html.
Open Sesame—Products, Competitive Summary, http://www.opensesame.com/prod_03.html.
Open Sesame—Products; eGenie Livel, http://www.opensesame.com/prod_06.html.
Open Sesame—Products; Learn Sesame, http://www.opensesame.com/products.html.
Open Sesame—Products; Product Datasheet, http://www.opensesame.com/prod_04.html.
Open Sesame—Products; Why Personalize?, http://www.opensesame.com/prod_01.html.
Open Sesame—The Company, http://www.opensesame.com/company.html.
Orbital Technologies: About Orbital Technologies, http://www.orbital-tech.com/about.html.
Orbital Technologies: Corporate Fact Sheet, Jan. 1998, http://www.orbital-tech.com.
Orbital Technologies: Orbital Organik White Paper, Jul. 1997, http://www.oribtal-tech.com/.
Orbital Technologies: Orbital Products, http://www.orbital-tech.com/products.html.
Orbital Technologies: Organik KnowledgeWare, http://www.oribtal-tech.com/organikkw.html.
Orbital Technologies: Organik Persona Server, http://www.orbital-tech.com/organikps.html.
Orbital Technologies: Our Focus, http://www.oribtal-tech.com/.
"Political Artifacts and Personal Privacy; The Yenta Multi-Agent Distributed Matchmaking System", Leonard Newton Foner, Apr. 30, 1999, @ Massachusetts Institute of Technology, 1999.
SignUp V2.0, http://www.email-software.com/pages 00033.htm, review of "Signup V2.0".
"Somewhat-by-topic linearization of Yenta," Leonard Foner, last modified Feb. 11, 1997, http://www.media.mit.edu/people/foner/Yenta/linearization-by-topic.html.
"Taking the byte out of cookies; privacy, consent, and the Web" Daniel Lin, and Michael C. Loul pp. 39-51 -Proceeding of the ethics and social Impact component on Shaping policy on the Information age May 10-12, 1998.
Natrificial: The Brain: Reviews, The Brain Press Reviews, http://www.natrificial.com/Brain/reviews.html.
TechWeb—The T Network, "The Brain: Much More The Way You Think", Scot Finnie, CMP Net Windows Magazine, http://www.windowsmagazine.com, May 1, 1998.
Enonymous Web Page, "The enonymous profile . . . .", http://www.enonymous.com/profile.asp.
Enonymous Web Page, "The enonymous zone . . . .", http://www.enonymous.com/zone.asp.
Autonomy, "The Technology Behind Autonomy Agentware", Autonomy Technology Page, http://www.agentware.com.
Natrifical: The Brain: Info, "The Web at the Speed of Thought", http://www.natrificial.com/Brain/info_03.html.
"Topic Real-Time", HP-UX-Documentation Disc 50726-10186 (from Software Patent Institute Database of Software Technologies), Feb. 1, 1995.
"Verity Introduces new Profiler Kit and enhanced developer's Kit" IAC Newsletter Collection—M2 Presswire, Aug. 5, 1998.
Enonymous: New users: what Is It?, What Is enonymous advisor?, http://www.enonymous.com/whatisit.asp.
Natrificial: The Brain: Information Management Software, "What's New", Natrificial Software Technologies, http://www.natrificial.com, 1998.
Enonymous Web Page, "Why be enonymous?", http://www.enonymous.com/whybeenon.asp.
Yenta: A Multi-Agent, Referral-Based Matchmaking System, Leonard N. Foner, The First International Conference on Autonomous Agents (Agents '97), Marina del Rey. CA, 1997.
ZDNet Reviews, "Your Brain on Windows", Leslie Ayers, ZD Net Products, http://www.zdnet.com/products, Mar. 5, 1998.
Autonomy—Knowledge Management and New Media Content Solutions, "Automony Value Proposition", Sep. 6, 2000, http:www.autonomy.com/valueproposition.html, 2 pages.
Orbital Software: About Orbital, "Orbital Software: Empowering The Online Community of Knowledge", http://www.orbitalsw.com/about/about.htm, Sep. 6, 2000, 5 pages.
Orbital Software: Product Intro, "Organik: Introduction, A Multitude of Possibilities", http://www.orbitalsw.com/product/product.htm, Sep. 6, 2000, 1 page.
David Golberg et al., "Using Collaborative Filtering to Weave and Information Tapestry", Communications of the ACM, Dec. 1992, vol. 35, No. 12, pp. 61.70.
Natrificial™ Software Technologies Introduces The Brain, Natrificial Software Technologies. Press Release [online] 1998 [retrieved on May 22, 2013]. Retrieved from the Internet: <URL:http://www.thefreelibrary.com/Natrificial(™)+Software+Technologies+Introduces+The+Brain(™)-a020174800>.
Gilder, G. Life Span vs Life Spam, Forbes. [online] Forbes ASAP, 1998 [retrieved on May 20, 2013]. Retrieved from the Internet: <URL:http://web.archive.org/web/19980418075922/http://forbes.com/asap/98/0406/074.htm>.
How enonymous advisor works. [online] Enonymous: 1999 [retrieved on May 22, 2013]. Retrieved from the Internet: <URL:http://web.archive.org/web/20000302005547/http:www.enonymous.com/>.
Organik: Introduction, A Multitude of Possibilities. [online] Orbital Software, 2000 [retrieved on May 22, 2013]. Retrieved from the Internet: <URL:http://web.archive.org/web/20001018044337/http:/www.orbitalsw.com/product/product.htm>.
U.S. Appl. No. 10/897,768, Final Office Action mailed on Oct. 9, 2007, 15 pages.
U.S. Appl. No. 10/897,768, Final Office Action mailed on Mar. 31, 2006, 16 pages.
U.S. Appl. No. 10/897,768, Final Office Action mailed on Mar. 2, 2007, 17 pages.
U.S. Appl. No. 10/897,768, Final Office Action mailed on Jul. 17, 2008, 20 pages.
U.S. Appl. No. 10/897,768, Final Office Action mailed on Aug. 17, 2009, 35 pages.
U.S. Appl. No. 10/897,768, Non-Final Office Action mailed on Aug. 9, 2006, 16 pages.
U.S. Appl. No. 10/897,768, Non-Final Office Action mailed on Feb. 4, 2008, 19 pages.
U.S. Appl. No. 10/897,768, Non-Final Office Action mailed on Jul. 27, 2005, 19 pages.
U.S. Appl. No. 10/897,768, Non-Final Office Action mailed on Mar. 4, 2009, 32 pages.
U.S. Appl. No. 10/897,768, Notice of Allowance mailed on Feb. 12, 2010, 13 pages.
U.S. Appl. No. 10/897,768, Notice of Allowance mailed on May 19, 2010, 5 pages.
U.S. Appl. No. 11/650,210, Final Office Action mailed on Jul. 24, 2008, 13 pages.
U.S. Appl. No. 11/650,210, Final Office Action mailed on Jun. 25, 2009, 29 pages.
U.S. Appl. No. 11/650,210, Non-Final Office Action mailed on Jan. 9, 2008, 15 pages.
U.S. Appl. No. 11/650,210, Non-Final Office Action mailed on Feb. 3, 2009, 24 pages.
U.S. Appl. No. 11/650,210, Notice of Allowance mailed on Feb. 1, 2010, 14 pages.

U.S. Appl. No. 11/650,210, Notice of Allowance mailed on May 14, 2010, 15 pages.

European Application No. EP99945206.3, Supplemental European Search Report mailed on Oct. 24, 2006, 2 pages.

International Application No. PCT/US1999/019482, International Preliminary Report on Patentability mailed on Nov. 14, 2000, 5 pages.

International Application No. PCT/US1999/019482, International Search Report and Written Opinion mailed on Nov. 17, 1999, 1 page.

International Application No. PCT/US99/19949, International Search Report and Written Opinion mailed on Dec. 7, 1999.

Hensley et al., Proposal for an Open Profiling Standard, NOTE-OPS-FrameWork.html, submitted to W3C on Jun. 2, 1997, XP-002279477, 12 pages.

Supplementary European Search Report for EPO Application No. EP 99 94 5206, 2 pgs, Oct. 24, 2006.

Patent Cooperation Treaty's Written Opinion for International application No. PCT/US99/19949, Oct. 19, 2000, 5 pgs.

PCT Notification of Transmittal of International Preliminary Examination Report for PCT Counterpart Application No. PCT/US99/19949, 6 pgs., Jan. 30, 2001.

PCT Notification of Transmittal of The International Search Report or The Declaration for PCT Counterpart Application No. PCT/US99/19482 Containing International Search Report, 4 pgs., Nov. 17, 1999.

Patent Cooperation Treaty's Written Opinion for International application No. PCT/US99/19482, 5 pgs., Jul. 24, 2000.

PCT Notification of Transmittal of International Preliminary Examination Report for PCT Counterpart Application No. PCT/US99/19482, 6 pgs., Jan. 16, 2001.

Didier Bourigault et al., "Term Extraction + Term Clustering: An Integrated Platform for Computer-Aided Terminology", Proceedings of EACL 1999, pp. 15-22.

"Clustering: An Introduction", A Tutorial on Clustering Algorithms, http:/home.dei.polimi.it/matteucc/Clustering/tutorial_html/, downloaded on Mar. 10, 2008, 5 pages.

Holtz, Shel., "Intranets: What's all the excitement?" Communication World, San Francisco: Jun./Jul. 1996, vol. 13, Iss 6, p. 54.

K. Moore, "MIME (Multipurpose Internet Mail Extensions) Part Two: Message Header Extensions for Non-ASCII Text," RFC1522, University of Tennessee, 11 pages, Sep. 1993.

McCandless, "Managing your Privacy in an On-Line World", Internet Services, MIT Laboratory for Computer Science, 2 pages, Jan.-Feb., 1997.

Maltz, David, et al., Association for Computing Machinery: "Pointing the Way: Active Collaborative Filtering"; CHI '95 MOSAIC of Creativity Conference Proceedings, May 7-11, 1995; pp. 202-209.

Notification of Transmittal of International Preliminary Examination Report for PCT/US99/20672, mailed Nov. 19, 2001, 6 pages.

Written Opinion for PCT/US99/20672, mailed May 10, 2001, 6 pages.

PCT International Search Report for PCT/US99/20672, mailed Dec. 16, 1999, 5 pages.

Written Opinion for PCT/US99/20487, mailed Aug. 3, 2000, 5 pages.

Notification of Transmittal of International Preliminary Examination Report for PCT/US99/20487, mailed Jan. 10, 2001, 5 pages.

PCT International Search Report for PCT/US99/20487, mailed Nov. 17, 1999, 4 pages.

Notification of Transmittal of International Preliminary Examination Report for PCT/US99/21110, mailed Feb. 21, 2001, 6 pages.

Written Opinion for PCT/US99/21110, mailed Sep. 28, 2000, 3 pages.

PCT International Search Report for PCT/US99/21110, mailed Jan. 24, 2000, 8 pages.

PCT International Search Report for PCT/US9921112, mailed Apr. 25, 2000, 4 pages.

Notification of Transmittal of International Preliminary Examination Report for PCT/US99/21112, mailed Feb. 21, 2001, 6 pages.

* cited by examiner

TERM-DOCUMENT BINDING TABLE — 200

| CLASS | NO. OF OCCURENCES | DENSITY |
|---|---|---|
| A | X | 4.00% |
| B | X | 2.00% |
| C | X | 1.00% |
| D | X | 0.5% |
| E | 3 | X |
| F | 1 | X |

WEIGHT TABLE — 210

| WEIGHT | TYPE | LENGTH | POS | OTHER |
|---|---|---|---|---|
| 10 | P | 1 | A | |
| 30 | L | 1 | V | |
| 150 | P | 2 | NN | |
| 300 | L | 2 | N | |
| 400 | L | 3 | N | |
| 450 | U | 7 | X | |

212 · 214 · 216 · 218

| A | B | C | D | E | F |
|---|---|---|---|---|---|
| 10 | 0 | 0 | 0 | 0 | 0 |
| 30 | 0 | 0 | 0 | 0 | 0 |
| 100 | 0.4 | 0.3 | 0.2 | 0.1 | 0.05 |
| 150 | 0.8 | 0.7 | 0.6 | 0.5 | 0.4 |
| 300 | 1.5 | 1.4 | 1.3 | 1 | 0.5 |
| 320 | 1.6 | 1.5 | 1.4 | 1.1 | 0.6 |
| 400 | 1.9 | 1.8 | 1.5 | 1.2 | 0.7 |
| 450 | 2 | 1.9 | 1.6 | 1.3 | 1 |

| | 0.063 | 0.125 | >>>>> | 32 | 64 | 128 |
|---|---|---|---|---|---|---|
| 10 | 0.1 | 0.2 | >>>>>> | 55 | 100 | 200 |
| 30 | 0.3 | 0.6 | >>>>>> | 180 | 350 | 600 |
| 100 | 1.6 | 2.8 | >>>>>> | 600 | 1000 | 2100 |
| 150 | 2.5 | 5 | >>>>>> | 1100 | 2000 | 5000 |
| 300 | 6.5 | 11 | >>>>>> | 2700 | 6000 | 15000 |
| 320 | 7.1 | 11.5 | >>>>>> | 2900 | 7000 | 16000 |
| 400 | 8 | 15 | >>>>>> | 3500 | 8000 | 20000 |
| 450 | 9 | 18 | >>>>>> | 4200 | 9000 | 24000 |

| USER ID | TERM ID | CONFIDENCE LEVEL | CONFIDENCE MEMORY | TIME STAMP |
|---|---|---|---|---|
| 1 | 101 | 990 | 990 | 9812120800 |
| 1 | 106 | 976 | 976 | 9807241400 |
| 1 | 207 | 950 | 950 | 9805121200 |
| . | . | . | | |
| 1 | 67 | 310 | 310 | 9812241900 |
| 1 | 98 | 300 | 300 | 9802110700 |
| 1 | 116 | 290 | 290 | 9804120900 |
| 1 | 190 | 287 | 287 | 9806060900 |
| . | . | . | | |
| 8 | 107 | 995 | 995 | 9811191000 |
| 8 | 128 | 992 | 992 | 9811201000 |
| 8 | 154 | 900 | 900 | 9712291300 |
| . | . | . | | |
| 8 | 62 | 370 | 370 | 9812181421 |
| 8 | 8 | 300 | 300 | 9812211600 |
| 8 | 52 | 207 | 207 | 9802021647 |
| 8 | 261 | 200 | 200 | 9802221147 |
| . | . | . | | |

FIG. 22

METHOD AND APPARATUS FOR CONSTRUCTING AND MAINTAINING A USER KNOWLEDGE PROFILE

This application is a continuation of U.S. patent application Ser. No. 09/614,943, filed Jul. 12, 2000, now issued as U.S. Pat. No. 6,421,669, which is a continuation-in-part of U.S. patent application Ser. No. 09/157,092, filed Sep. 18, 1998, now issued as U.S. Pat. No. 6,115,709.

FIELD OF THE INVENTION

The present invention relates generally to the field of knowledge management and, more specifically, to a method and apparatus for automatically constructing a user knowledge profile and knowledge repository of electronic documents.

BACKGROUND OF THE INVENTION

The new field of "knowledge management" (KM) is receiving increasing recognition as the gains to be realized from the systematic effort to store and export vast knowledge resources held by employees of an organization are being recognized. The sharing of knowledge broadly within an organization offers numerous potential benefits to an organization through the awareness and reuse of existing knowledge, and the avoidance of duplicate efforts.

In order to maximize the exploitation of knowledge resources within an organization, a knowledge management system may be presented with two primary challenges, namely (1) the identification of knowledge resources within the organization and (2) the distribution and accessing of information regarding such knowledge resources within the organization.

The identification, capture, organization and storage of knowledge resources is a particularly taxing problem. Prior art knowledge management systems have typically implemented knowledge repositories that require users manually to input information frequently into pre-defined fields, and in this way manually and in a prompted manner to reveal their personal knowledge base. However, this approach suffers from a number of drawbacks in that the manual entering of such information is time consuming and often incomplete, and therefore places a burden on users who then experience the inconvenience and cost of a corporate knowledge management initiative long before any direct benefit is experienced. Furthermore, users may not be motivated to describe their own knowledge and to contribute documents on an ongoing basis that would subsequently be re-used by others without their awareness or consent. The manual input of such information places a burden on users who then experience the inconvenience and cost of a corporate knowledge management initiative long before any direct benefit is experienced.

It has been the experience of many corporations that knowledge management systems, after some initial success, may fail because either compliance (i.e., the thoroughness and continuity with which each user contributes knowledge) or participation (i.e., the percentage of users actively contributing to the knowledge management system) falls to inadequate levels. Without high compliance and participation, it becomes a practical impossibility to maintain a sufficiently current and complete inventory of the knowledge of all users. Under these circumstances, the knowledge management effort may never offer an attractive relationship of benefits to costs for the organization as a whole, reach a critical mass, and the original benefit of knowledge management falls apart or is marginalized to a small group.

In order to address the problems associated with the manual input of knowledge information, more sophisticated prior art knowledge management initiatives may presume the existence of a centralized staff to work with users to capture knowledge bases. This may however increase the ongoing cost of knowledge management and requires a larger up-front investment before any visible payoff, thus deterring the initial funding of many an otherwise promising knowledge management initiatives. Even if an initial decision is made to proceed with such a sophisticated knowledge management initiative, the cash expenses associated with a large centralized knowledge capture staff may be liable to come under attack, given the difficulty of quantifying knowledge management benefits in dollar terms.

As alluded to above, even once a satisfactory knowledge management information base has been established, the practical utilization thereof to achieve maximum potential benefit may be challenging. Specifically, ensuring that the captured information is readily organized, available, and accessible as appropriate throughout the organization may be problematic.

SUMMARY OF THE INVENTION

According to the present invention, there is provided a method of constructing an entity profile including first and second portions having different access restrictions. A confidence level is automatically assigned to content within an electronic document associated with a first entity. The content is potentially descriptive of the first entity. The content is automatically rejected for inclusion within the entity profile if the confidence level assigned to the content is less than a predetermine threshold. On the other hand, if the confidence level assigned to the content exceeds the predetermined threshold, the content is automatically included within the first portion of the first entity. The content is automatically presented to the first entity for authorization by the first entity for inclusion of the content within the second portion of the entity profile. The first and second portions of the entity profile have different access restrictions with respect to a second entity.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 10 illustrates a term-document binding table, according to an exemplary embodiment of the present invention.

FIG. 11 illustrates a weight table, according to an exemplary embodiment of the present invention.

FIG. 22 illustrates a user-term table, according to an exemplary embodiment of the present invention, that is shown to include a confidence level value column, a confidence memory value column and a time stamp column.

DETAILED DESCRIPTION

Figure 1:
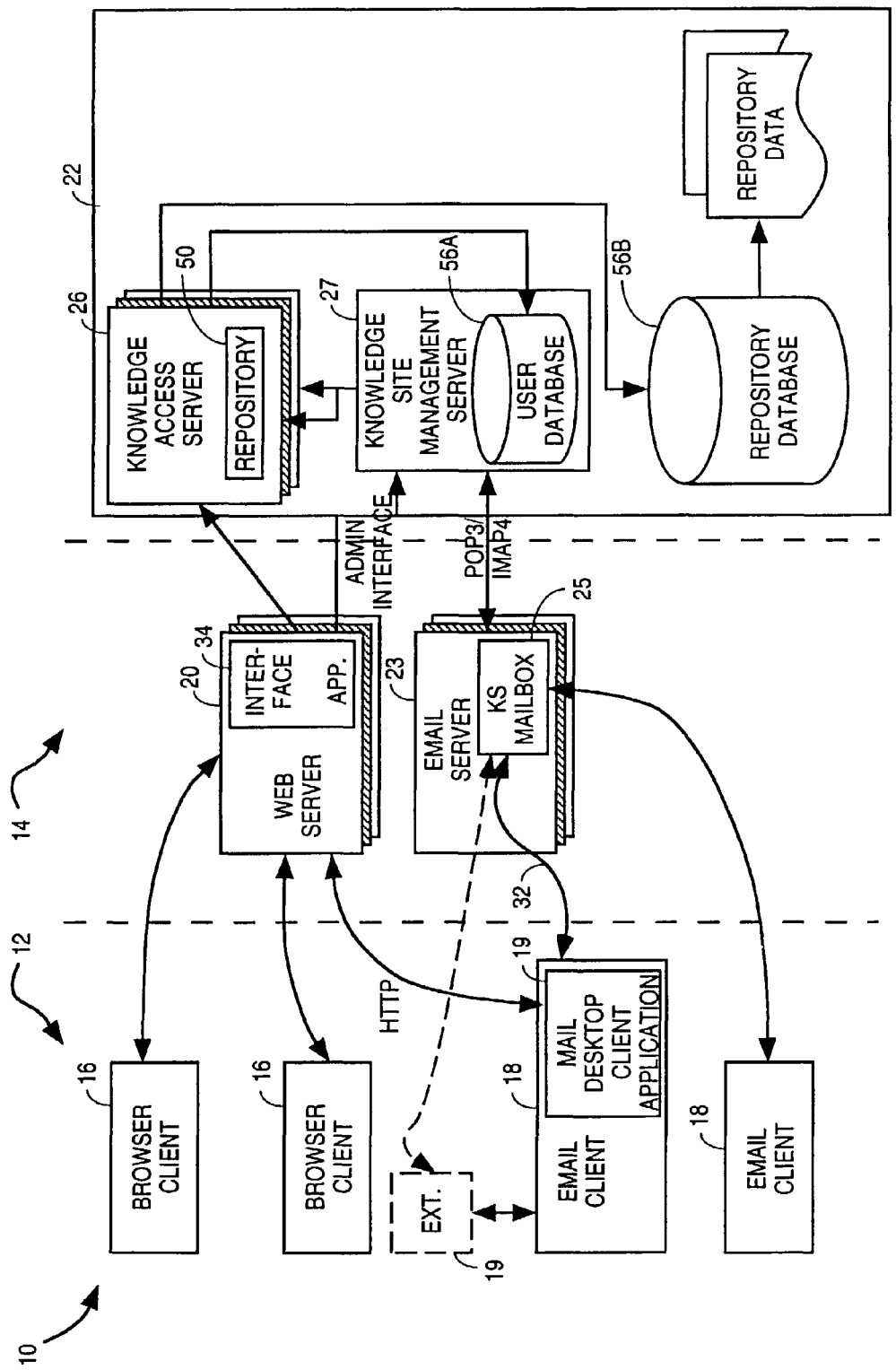
FIG. 1 is a block diagram illustrating a knowledge management system, according to an exemplary embodiment of the present invention.

A method and apparatus for constructing and maintaining a user knowledge profile are described. In the following description, for purposes of explanation, numerous specific details are set forth in order to provide a thorough understanding of the present invention. It will be evident, however, to one skilled in the art that the present invention may be practiced without these specific details.

Overview

With a view to addressing the above described difficulties associated with manual knowledge capture either by a profile owner or by a dedicated staff, there is provided a method and apparatus for capturing knowledge automatically, without excessive invasion or disruption of normal work patterns of participating users. Further, the present specification teaches a method and apparatus whereby a database of captured knowledge information is maintained continuously and automatically, without requiring that captured knowledge information necessarily be visible or accessible to others. The present specification also teaches facilitating the user input and modification of a knowledge profile associated with the user in a knowledge database at the user's discretion.

The present specification teaches a method and apparatus for intercepting electronic documents, such as for example e-mail messages, originated by a user, and extracting terms therefrom that are potentially indicative of a knowledge base of the originating user. The extracted knowledge terms may then be utilized to construct a user knowledge profile. The grammatical structure, length, frequency and density with which the extracted knowledge terms occur within electronic documents originated by a user, and prior history of use of the extracted knowledge terms within an organization may furthermore be utilized to attach a metric, in the form of a confidence level value, to the relevant knowledge terms for the purpose of grouping, ranking, and prioritizing such knowledge terms. Knowledge terms may furthermore be stored in either a private or public portion of the user knowledge profile, depending upon the confidence level values thereof.

It will be appreciated that the large volume of e-mail messages traversing an e-mail system over a period of time will contain a large number of terms that may be irrelevant to the identification of the knowledge base of a user. With a view to determining which terms are truly indicative of a knowledge base, a number of rules (or algorithms) may be exercised with respect to extracted terms to identify terms that are candidates for inclusion within a public portion of the user knowledge profile. Further rules (or algorithms) may be applied to an assembled knowledge profile for the purpose of continually organizing and refining the profile.

Corporate e-mail systems have become increasingly pervasive, and have become an accepted medium for idea communication within corporations. Accordingly, the content of e-mail messages flowing within a large organization amounts to a vast information resources that, over the course of time, may directly or indirectly identify knowledge bases held by individuals within the organization.

The present specification also teaches addressing privacy concerns associated with the examination of e-mail messages for the above purposes by providing users with the option selectively to submit originated e-mail messages for examination, or alternatively to bypass the examination and extraction system of the present invention.

There is also taught a computer-implemented method and apparatus for addressing an electronic document, such as an e-mail message, for transmission over a computer network. The e-mail message may be examined to identify terms therein. The identified terms are then compared to a number of user knowledge profiles with a view to detecting a predetermined degree of correspondence between the identified terms and any one or more of the user knowledge profiles. In the event that a predetermined degree of correspondence is detected, the sender of the electronic document is prompted to the either accept or decline the proposed recipient as an actual recipient of the electronic document, after first being offered an opportunity to inspect the specific basis of the correspondence between the identified terms and the proposed recipients. The e-mail message may also be parsed to extract recipients entered manually by the user. The degree of correspondence between the knowledge profiles of the manually entered recipients and the identified terms of the message is then optionally used as the basis of recommendations to the user that certain manually entered recipients be dropped from the ultimate list of recipients.

This aspect of the present teachings is advantageous in that a sender of an e-mail message is presented with a list of proposed recipients, identified according to their knowledge profiles and the content of the e-mail message, who may be interested in receiving the e-mail message. Accordingly, the problems of over-distribution and under-distribution of e-mail messages that may be encountered within an organization may be reduced. Specifically, in the over-distribution situation, many users are frequently copied on e-mail messages, resulting in lost productivity as the users struggle to cope with increasing volumes of daily e-mail. Further, when the time available to read e-mail messages becomes restricted, users typically begin to defer reading of e-mail messages, and communication efficiency within the organization may be adversely affected. In the under-distribution situation, it may occur that the proper recipients of the message are not included in the distribution list, and accordingly fall "out of the loop".

There is also taught a method of facilitating a user profile query or look-up wherein, in response to a match between a query and a user profile, the owner of the user profile may be prompted for authorization to publish all (or a portion) of the user profile to the originator of the query or to others generally. This is advantageous in that it addresses the above mentioned privacy concerns by treating the knowledge profile as a confidential resource under the control of the user. The user is thus also able to control the timing, circumstances and extent to which it is made accessible to others. A further advantage is that the user is prompted for input specifically to satisfy specific, pending requests of others. This relieves the user of the need to remember to modify his or her profile on a regular basis and the need to make decisions concerning the composition of the profile prospectively, prior to any actual use of the profile by others. In this manner the user saves time and effort, since the determination that manual interaction with the profile is necessary is a function of the present system, not a responsibility of the user.

There is also taught a method of assigning a confidence level value to a term within an electronic document. This confidence level value is based on a first quantitative indicator, derived from the number of occurrences of the term within the electronic document, and a second characteristic indicator, derived utilizing the characteristic of the term.

For the purposes of the present application, the word "term" shall be taken to include any acronym, word, collection of words, phrase, sentence, or paragraph. The term "confidence level" shall be taken to mean any indication, numeric or otherwise, of a level within a predetermined range.

System Architecture

FIG. 1 is a block diagram illustrating a knowledge management system 10, according to an exemplary embodiment of the present invention. The system 10 may conveniently be viewed as comprising a client system 12 and a server system 14. The client system 12 may comprise one or more clients, such as browser clients 16 and e-mail clients 18, that are resident on terminals or computers coupled to a computer network. In one exemplary embodiment, each of the browser clients 16 may comprise the Internet Explorer client developed by Microsoft Corp. of Redmond, Wash., or the Netscape Navigator client developed by Netscape Communications of Menlo Park, Calif. Each of the e-mail clients 18 may further comprise the Outlook Express, Outlook 97, Outlook 98 or Netscape Communicator e-mail programs. As will be described in further detail below, the browser and e-mail clients 16 are complemented by extensions 19, that enable the e-mail clients 18 to send an electronic message (e.g., either an e-mail or HTML document) to a knowledge server 22 implemented on the server side 14 of the system 10. As shown in FIG. 1, the extensions 19 may be integral with an e-mail client 18, or external to the client 18 and in communication therewith. The clients 16 and 18 may default to sending every communication to a relevant component of the knowledge server 22, while allowing a user specifically to designate a communication not suitable for transmission to the knowledge server 22. The user designation may be facilitated through controls that are installed as software modules which interact with or modify an e-mail client 18, and which cause messages to be copied to a special e-mail address (e.g., a Knowledge Server (KS) mailbox 25 maintained by a e-mail server 23) associated with a knowledge server component. In the case where a client extension 19 for performing this automatic transmission is not available, the user can manually add the e-mail address of the KS mailbox 25 to the list of recipients for the message. Further details in this regard are provided below. Files embedded within an e-mail message, such as attachments, may also be selectively included or excluded from the capture process and may also be selectively included or excluded from retention in a knowledge repository.

The browser clients 16 are used as an additional means to submit documents to the knowledge server 22 at the discretion of a user. The browser client 16 is used to access an interface application 34, maintained on a web server 20, which transmits documents to the knowledge server 22.

In alternate embodiments, a client may also propagate a list of bookmarks, folders or directories to the knowledge server 22 for the purpose of user knowledge profile construction.

Server Side Architecture

The server side 14 of the system 10 includes the web server 20, the e-mail server 23 and the knowledge server 22. The web server 20 may be any commercially available web server program such as Internet Information Server (IIS) from Microsoft Corporation, the Netscape Enterprise Server, or the Apache Server for UNIX. The web server 20 includes the interface application 34 for interfacing with the knowledge server 22. The web server 20 may run on a single machine that also hosts the knowledge server 22, or may alternatively run along with the interface application 34 on a dedicated web server computer. The web server 20 may also be a group of web server programs running on a group of computers to thus enhance the scalability of the system 10. As the web server 20 facilitates access to a local view of a knowledge repository 50, maintained by the knowledge access server 26, by the browser clients 16, the web server interface application 34 implements knowledge application interfaces, knowledge management interfaces, user profile creation and maintenance interfaces, and a server management interface. The web server 20 also facilitates knowledge profile queries, e-mail addressing to an e-mail client 18, and any other access to the knowledge server 22 using the standard HTTP (web) protocol.

The knowledge server 22 includes a knowledge site management server (KSMS) 27 and the knowledge access server (KAS) 26. The knowledge server access 26 includes an interface that provides a local view of a knowledge repository 50, which is physically stored in the user database 56A and a repository database 56B. The knowledge site management server 27 is shown to have access to the local view of the knowledge repository 50 maintained by the knowledge access server 26. The illustrated components of the knowledge server 22 are collectively responsible for the capture (termed "knowledge discovery") of terms indicative of a user knowledge base and for the distribution of user knowledge profile information. Knowledge discovery may be done by the examination and processing of electronic documents, such as e-mail messages, which may be propagated to the e-mail server 23 from an e-mail client 18 via the Simple Mail Transfer Protocol (SMTP), as shown at 32. Alternatively, knowledge discovery may be implemented by the examination of submissions from a browser client 16 via the web server 20.

The knowledge server 22 includes the knowledge access server 26 and the knowledge site management server 27 as two separate and distinct server systems in view of the divergent functions provided by the servers 26 and 27. Specifically, the knowledge site management server 27 functions primarily to manage non-interactive processing (e.g., the extraction of knowledge from inbound e-mail messages), to manage the user information database 56A, and to implement various centralized system management processes. The knowledge site management server 27 does not communicate interactively with clients 18, or with clients 16 except for administrative functions. The knowledge access server 26, on the other hand, functions primarily to respond to queries and updates from users submitted via clients, typically browser clients 16. Multiple instances of a knowledge access server 26 may be required to support a large corporate environment and to provide appropriate scalability; however only one knowledge site management server 27, one user database 56A, and one repository database 56B typically exist in a working system. In small scale environments, the web server 20, knowledge access server 26, and knowledge site management server 27, and even the e-mail server 23, may all optionally be deployed on the same physical computer.

Figure 2:
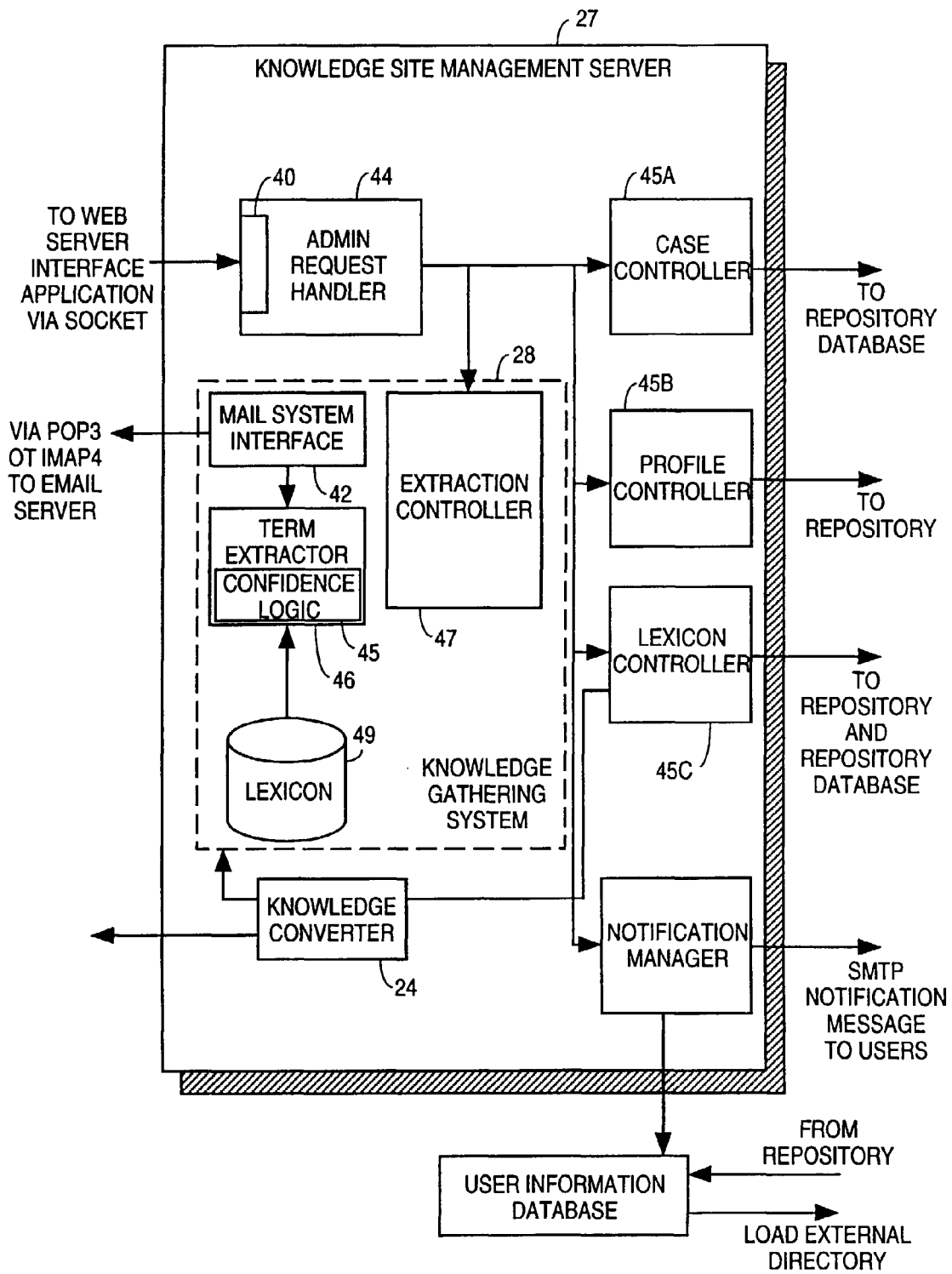
FIG. 2 is a block diagram illustrating a knowledge site management server, according to an exemplary embodiment of the present invention.

FIG. 2 is a block diagram illustrating an exemplary embodiment, according to the present invention, of the knowledge site management server 27. The server 27 is shown to include a socket front-end 40 to facilitate communication with the web server 20 for administrative requests, a request handler 44, a knowledge gathering system 28, a knowledge converter 24, and a variety of specialized controller modules 45A-45C. The request handler 44, upon receiving a request from the web server 20 via the interface application 34 and socket front-end 40, starts a session to process the request such as, for example, a request by an authorized systems administrator to configure the behavior of the knowledge gathering system 28.

The knowledge gathering system 28 is shown in FIG. 2 to include an extraction controller 47, a mail system interface 42, and a term extractor 46 including confidence logic 45. The extraction controller 47 commands the mail system interface 42 to retrieve messages submitted by the e-mail client extensions 19 to the KS mailbox 25 on the e-mail server 23 for the purpose of extraction and processing. The extraction controller 47 can request this continuously or periodically on a scheduled basis, so that messages can be processed at a convenient time when computing resources are lightly loaded, for example, overnight. The mail system interface 42 retrieves e-mail messages from the e-mail server 23 using the Simple Mail Transfer Protocol (SMTP), Post Office Protocol 3 (POP3), or Internet Message Access Protocol 4 (IMAP4) protocols. The mail system interface 42 propagates electronic documents directly to a term extractor 46, including confidence logic 45, that operates to convert electronic documents into per-user knowledge profiles that are stored in a knowledge repository 50. The term extractor 46 may include any commercially available term extraction engine (such as "NPTOOL" from LingSoft Inc. of Helsinki, Finland, or "Themes" from Software Scientific) that analyzes the electronic document, recognizes noun phrases in the document, and converts such phrases to a canonical form for subsequent use by the confidence logic 45 as candidate terms in a knowledge profile.

The term extractor 46 performs a variety of the steps when parsing and decoding an electronic document, such as interpreting any special attributes or settings encoded into the header of the message of the e-mail client 18, resolving the e-mail addresses of recipients against either the built-in user database or an external user database, preprocessing the electronic document, extracting noun-phrases from the text as candidates for knowledge terms, processing these knowledge terms, and storing summary information about the document and extraction process in the databases 56A and 56B. The term extractor 46 further detects and strips out non-original texts, attachments and in some cases the entire electronic document based on the document not meeting predetermined minimum criteria. Further details regarding the exact procedures implemented by the term extractor 46 will be provided below. Once the term extractor 46 has extracted the knowledge terms, the knowledge repository 50 is updated. Specifically, new terms are added, and repetitions of known terms are used to update the knowledge repository 50.

The knowledge repository 50 is defined by a hierarchical structure of classes. The objects of these classes represent the knowledge information that includes, inter alia, user profiles (including knowledge profiles) and organizational structure, and are stored in two databases: the user database 56A and the repository database 56B. The repository database 56B contains profile and repository information and can use one of a number of commercial relational database management systems that support the Open DataBase Connectivity (ODBC) interface standard. A database interface 54 provides a logical database-independent class API to access the physical databases and to shield the complete server codes from accessing database native API so that the server process can use any relational database management system (RDMS). Because the repository database 56A is open to inspection by systems administrators, and may be hosted on an existing corporate system, special measures may be taken to enhance the privacy of information in the repository database 56B; for example, the repository database 56B contains no actual user names or e-mail addresses, but instead may use encrypted codes to represent users in a manner that is meaningful only in combination with the user database. The user database 56A is a small commercial RDBMS embedded into the knowledge repository 50 in such a way that it cannot be accessed except through the interfaces offered by the system 10. The user database 56A contains encrypted identifying codes that allow the names of actual users to be associated with e-mail addresses, login IDs, passwords, and profile and repository information in the repository database.

A lexicon controller 45C is responsible for building tables of associated terms. Terms are considered "associated" with each other to the extent that they tend to co-occur in close proximity within the documents of multiple users. The lexicon controller 45C manages the background process of data mining that is used to discover associations between terms and record those in special association tables within the repository database 56B.

A profile controller 45B is a module that may optionally be included within the knowledge site management server 27, and manages a queue of pending, compute-intensive operations associated with updating profiles. Since the algorithm for the confidence level value calculation of a term (embodied in the confidence logic 45) depends on the total number of documents profiled, the confidence level value for each and every term in a user's profile is technically obsolete when any document is profiled. The profile controller 45B manages the "recalculation" of profiles. The actual operation is performed within the knowledge access server 26, which has a knowledge repository 50 interface.

A case controller 45A keeps track of open cases and initiates notifications to users concerning their status. A "case" is a pending request from one user to another, as will be detailed below. For example, if a user requests an expert in a certain field via a client browser client 16, the knowledge access server 26 matches the term against both the public and private portions of all user profiles. If a high confidence, but private, match is found, the system cannot reveal the identity of the matched person to the inquirer and must therefore open a "case". The case places a notification in the profile "home" page of the target user and/or transmits an e-mail message with a link back to that page. The target user may then (via a browser):

1. See the identity of the inquirer and the basis of the match.
2. See comments added by the inquirer.
3. Deny the request, at which point the case is closed.
4. Put a block on any further matches from that person or based on that term.
5. Go into the profile and edit the term responsible for the match.
6. Indicate that the case is accepted and provide authorization to reveal the identity of the target to the inquirer.

From the perspective of the inquirer, private matches are initially returned with a match strength only and do not reveal the name of the person or document matched. The user can then initiate cases for any or all of these private matches, based on how urgently the information is needed, how good the matches were, and whether the public matches are sufficient. Each case gets an expiration date set by the inquirer and notification options regarding how the inquirer wants to be told about the disposition of the case. Open cases are summarized in the Web area for the inquirer, along with the date and query that generated the return values. If the target denies a case, that status is communicated to the user. The user has no option to send e-mail or otherwise further identify that person. If the target accepts the case, the identity of the target is communicated to the user by updating the case record and the case is closed. Case history retention options are a site administration option.

Figure 3:
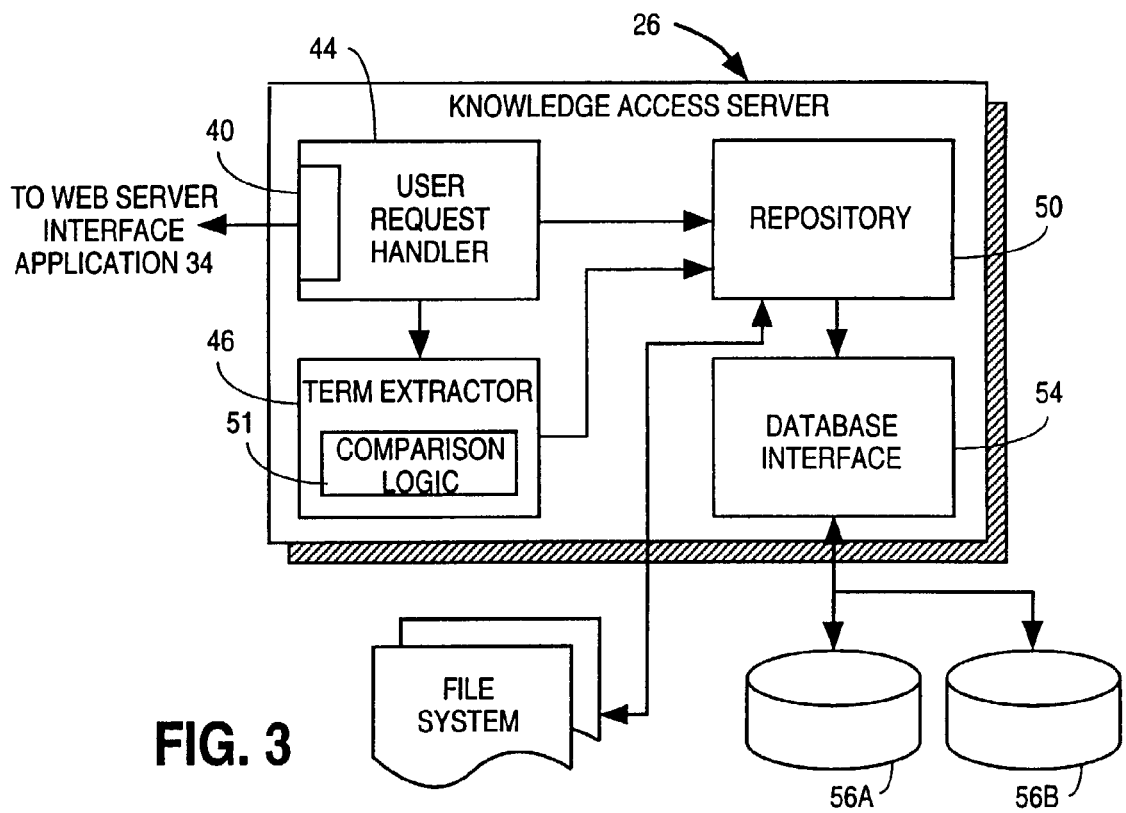
FIG. 3 is a block diagram illustrating a knowledge access server, according to an exemplary embodiment of the present invention.

FIG. 3 is a block diagram illustrating the components that constitute the knowledge access server 26. The knowledge access server 26 is shown to include a socket front-end 40 to facilitate communication with the web server interface application 34. The knowledge access server 26 further includes a request handler 44, a term extractor 46, a knowledge repository 50 and a database interface 54 that function in a manner similar to that described above with reference to the knowledge gathering system 28. The term extractor 46 includes comparison logic 51, the functioning of which will be described below. The knowledge access server 26 functions primarily as an interface between knowledge users and the knowledge repository 50. It provides services to the web server interface application 34, which implements a number of user interfaces as described above for interacting with the knowledge repository 50.

Figure 4:
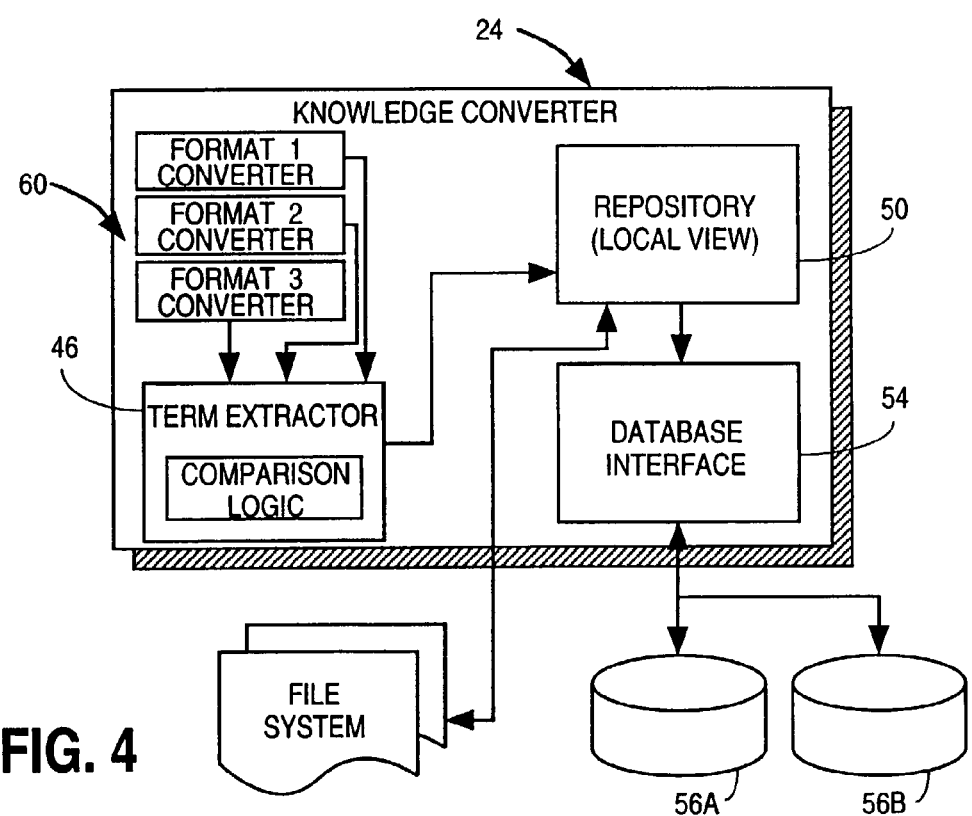
FIG. 4 is a block diagram illustrating a knowledge converter, according to an exemplary embodiment of the present invention.

FIG. 4 is a block diagram illustrating the components that constitute the knowledge converter 24. The knowledge converter 24 is shown to include a term extractor 46 that is fed from an array of format converters 60. The knowledge converter 24 is able to access the knowledge repository 50, and to import data from other knowledge systems, or export knowledge to other knowledge systems, via each of the format converters 60.

Returning to FIG. 1, the knowledge access server 26 implements the interface to the knowledge repository 50 and the knowledge site management server 27 is shown to access the knowledge repository 50 via the knowledge access server 26. FIGS. 3 and 4 illustrate data for the knowledge repository 50 as residing in databases 56A and 56B. The databases 56A and 56B are built on a general database interface 54 and provide persistent storage for the core system classes referred to above. In one exemplary embodiment of the present invention, the user database and the repository databases are implemented utilizing the Microsoft SQL server, developed by Microsoft Corp. of Redmond Wash., to provide default storage management services for the system. However, programming may be done at a more general level to allow for substitution of other production class relational database management systems, such as those developed by Sybase, Oracle or Informix.

Client Side Architecture

Figure 5:
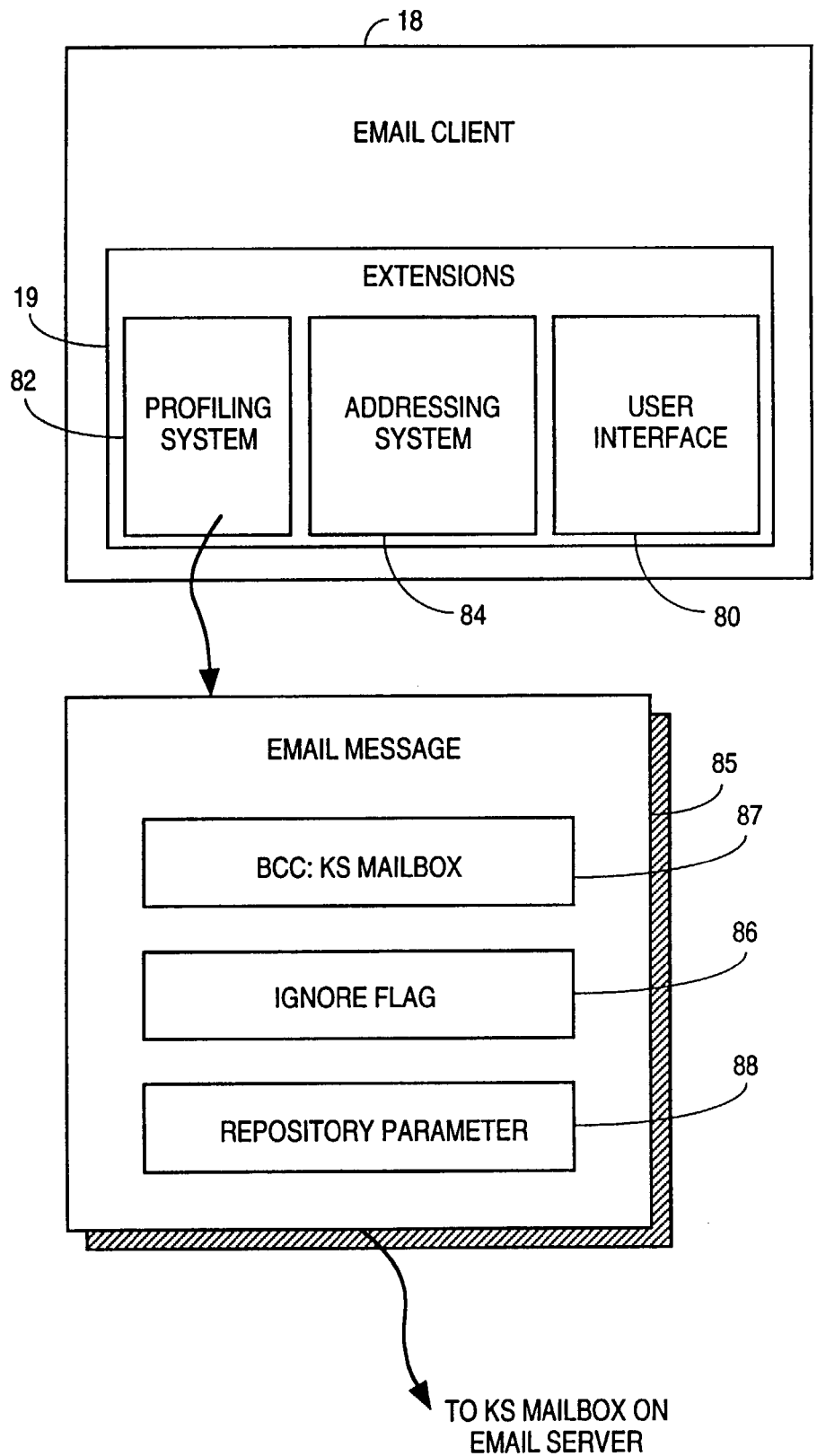
FIG. 5 is a block diagram illustrating a client software program, and an e-mail message generated thereby, according to an exemplary embodiment of the present invention.

FIG. 5 is a diagrammatic representation of a client, according to an exemplary embodiment of the present invention, in the form of an e-mail client 18. It will be appreciated that the e-mail client 18 may be any commercially available e-mail client, such as a Microsoft Exchange, Outlook Express, Outlook 97/98 or Lotus Notes client. The e-mail client 18 includes modifications or additions, in the form of the extensions 19, to the standard e-mail client to provide additional functionality. Specifically, according to an exemplary embodiment of the present invention, three subsystems are included within the e-mail client extensions 19, namely a user interface 80, a profiling system 82, and an addressing system 84.

The profiling system 82 implements properties on an originated message, as well as menu and property sheet extensions at global and message levels for users to set and manipulate these new properties. More specifically, profiling system 82 provides a user with a number of additional options that determine how a message 85 propagated from the e-mail client 18 to the knowledge repository 50 will be processed and handled for the purposes of knowledge management. A number of the provided options are global, while others apply on a per-message basis. For example, according to one exemplary embodiment, the following per-message options (or flags) may be set by a user to define the properties of an e-mail message:

1. An "Ignore" flag 86 indicating the e-mail message should not be processed for these purposes of constructing or maintaining a user knowledge profile, and should not be stored.
2. A "Repository" parameter 88 indicating that the message may be processed for the purposes of constructing a knowledge profile and then stored in the repository 50 for subsequent access as a document by others. The "Repository" parameter 88 also indicates whether the document (as opposed to terms therein) is to be stored in a private or public portion of the repository 50.

A number of global message options may also be made available to a user for selection. For example, an e-mail address (i.e., the KS mailbox 25 or the e-mail server 23) for the knowledge server 22 may be enabled, so that the e-mail message is propagated to the server 22.

Actual implementation and presentation of the above per-message and global options to the user may be done by the addition of a companion application or set of software modules which interact with API's provided by e-mail clients, or modules which modify the e-mail client itself, which are available during message composition. If the user activates the Ignore flag 86, the profiling system 82 will not make any modifications to the message and no copy of the message will be sent to the knowledge gathering system 28 via the KS mailbox 25. Otherwise, per-message options, once obtained from the user, are encoded. Subsequently, when the user chooses to send the message 85 using the appropriate control on the particular e-mail client 18, the e-mail address of the knowledge gathering server is appended to the blind copy list for the message. The profiling system 82 encrypts and encodes the following information into the message header, for transmission to and decoding by the knowledge gathering system 28, in accordance with Internet specification RFC 1522:

1. The list of e-mail addresses in the "to:" and "cc:" lists;
2. Per-message options as appropriate; and
3. For those recipients suggested by the addressing system 84 (see below), a short list of topic identifiers including the primary topics found within the message and the primary topics found within the user profile that formed a basis of a match.
4. Security information to validate the message as authentic.

When the message 85 is sent over the normal e-mail transport, the following events occur:

1. Recipients on the "to:" and "cc:" lists will receive a normal message with an extra header containing the encoded and encrypted options. This header is normally not displayed by systems that read e-mail and can be ignored by recipients;
2. The recipients will not be aware that the knowledge gathering system has received a blind copy of the message; and
3. If the sender chooses to archive a copy of the message 85, the e-mail address of the knowledge gathering system 28 will be retained in the "bcc" field as a reminder that the message was sent to the knowledge gathering server.

Further details concerning the addressing system 86 will be discussed below.

The Repository

Figure 6:
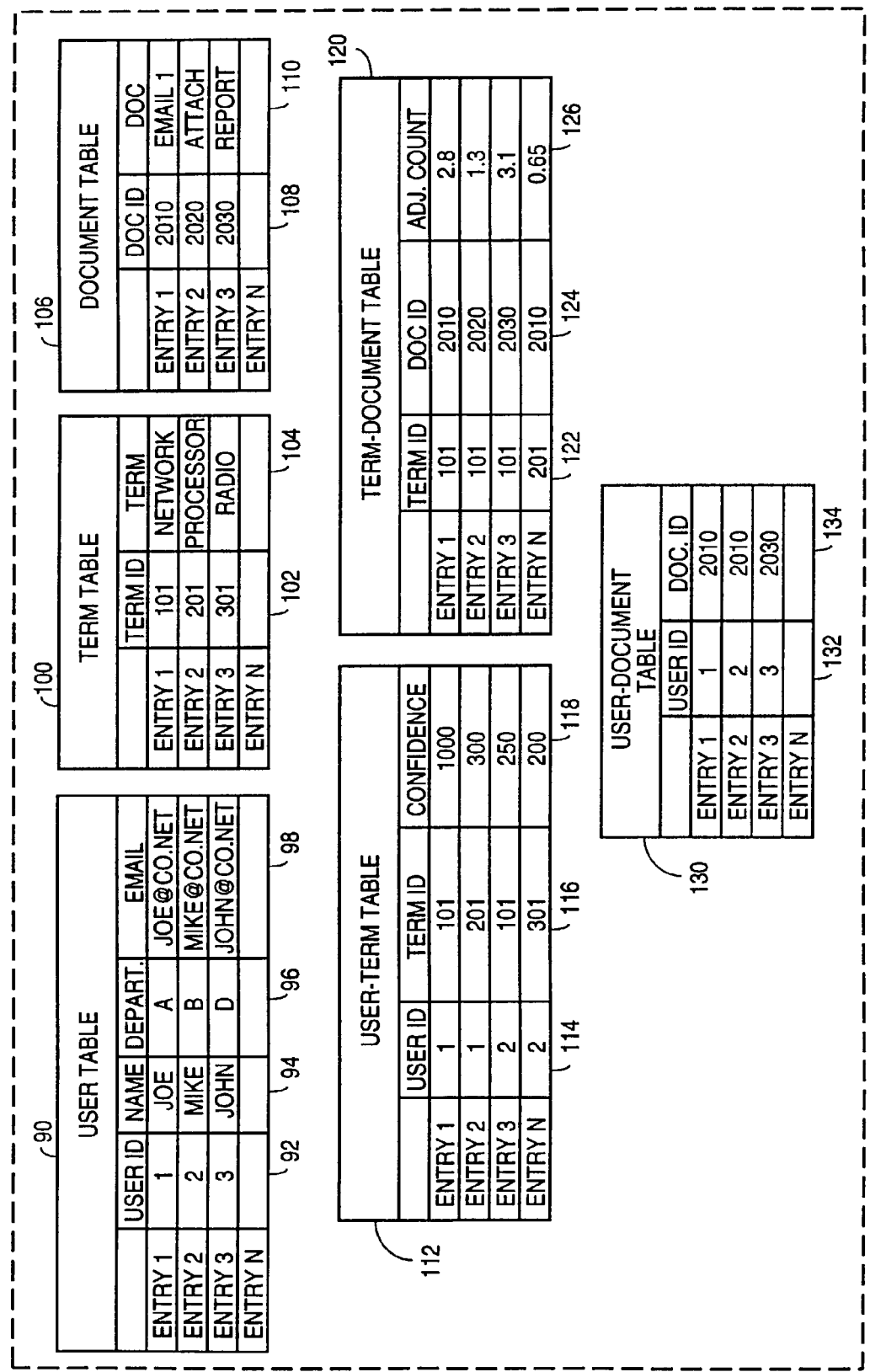
FIG. 6 is a block diagram illustrating the structure of a knowledge repository, according to an exemplary embodiment of the present invention, as constructed from the data contained in a repository database and a user database.

FIG. 6 is a block diagram illustrating the structure of the repository 50, according to one exemplary embodiment of the present invention, as constructed from data contained in the repository database 56B, and the user database 56A. The repository 50 is shown to include a number of tables, as constructed by a relational database management system (RDBMS). Specifically, the repository 50 includes a user table 90, a term table 100, a document table 106, a user-term table 112, a term-document table 120 and a user-document table 130. The user table 90 stores information regarding users for whom knowledge profiles may be constructed, and includes an identifier column 92, including unique keys for each entry or record within the table 90. A name column 94 includes respective names for users for whom knowledge profiles are maintained within the repository 50. A department column 96 contains a description of departments within an organization to which each of the users may be assigned, and an e-mail column 98 stores respective e-mail addresses for the users. It will be appreciated that the illustrated columns are merely exemplary, and a number of other columns, storing further information regarding users, may be included within the user table 90.

The term table 100 maintains a respective record for each term that is identified by the term extractor 46 within an electronic document, and that is included within the repository 50. The term table 100 is shown to include an identifier column 102, that stores a unique key for each term record, and a term column 104 within which the actual extracted and identified terms are stored. Again, a number of further columns may optionally be included within the term table 100. The document table 106 maintains a respective record for each document that is processed by the term extractor 46 for the purposes of extracting terms therefrom. The document table 106 is shown to include an identifier column 108, that stores a unique key for each document record, and a document name column 110, that stores an appropriate name for each document analyzed by the term extractor 46.

The user-term table 112 links terms to users, and includes at least two columns, namely a user identifier column 114, storing keys identifying users, and a term identifier column 116, storing keys identifying terms. The user-term table 112 provides a many-to-many mapping of users to terms. For example, multiple users may be associated with a single term, and a single user may similarly be associated with multiple terms. The table 112 further includes a confidence level column 118, which stores respective confidence level values, calculated in the manner described below, for each user-term pair. The confidence level value for each user-term pair provides an indication of how strongly the relevant term is coupled to the user, and how pertinent the term is in describing, for example, the knowledge base of the relevant user.

The term-document table 120 links terms to documents, and provides a record of which terms occurred within which document. Specifically, the term-document table 120 includes a term identifier column 122, storing keys for terms, and a document identifier column 124, storing keys for documents. The table 120 further includes an adjusted count column 126, which stores values indicative of the number of occurrences of a term within a document, adjusted in the manner described below. For example, the first record within the table 120 records that the term "network" occurred within the document "e-mail 1" 2.8 times, according to the adjusted count.

The user-document table 130 links documents to users, and includes at least two columns, namely a user identifier column 132, storing keys identifying users, and a document identifier column 134, storing keys identifying various documents. For example, the first record within the exemplary user-document table 130 indicates that the user "Joe" is associated with the document "e-mail 1". This association may be based upon the user being the author or recipient of the relevant document.

Figure 7:
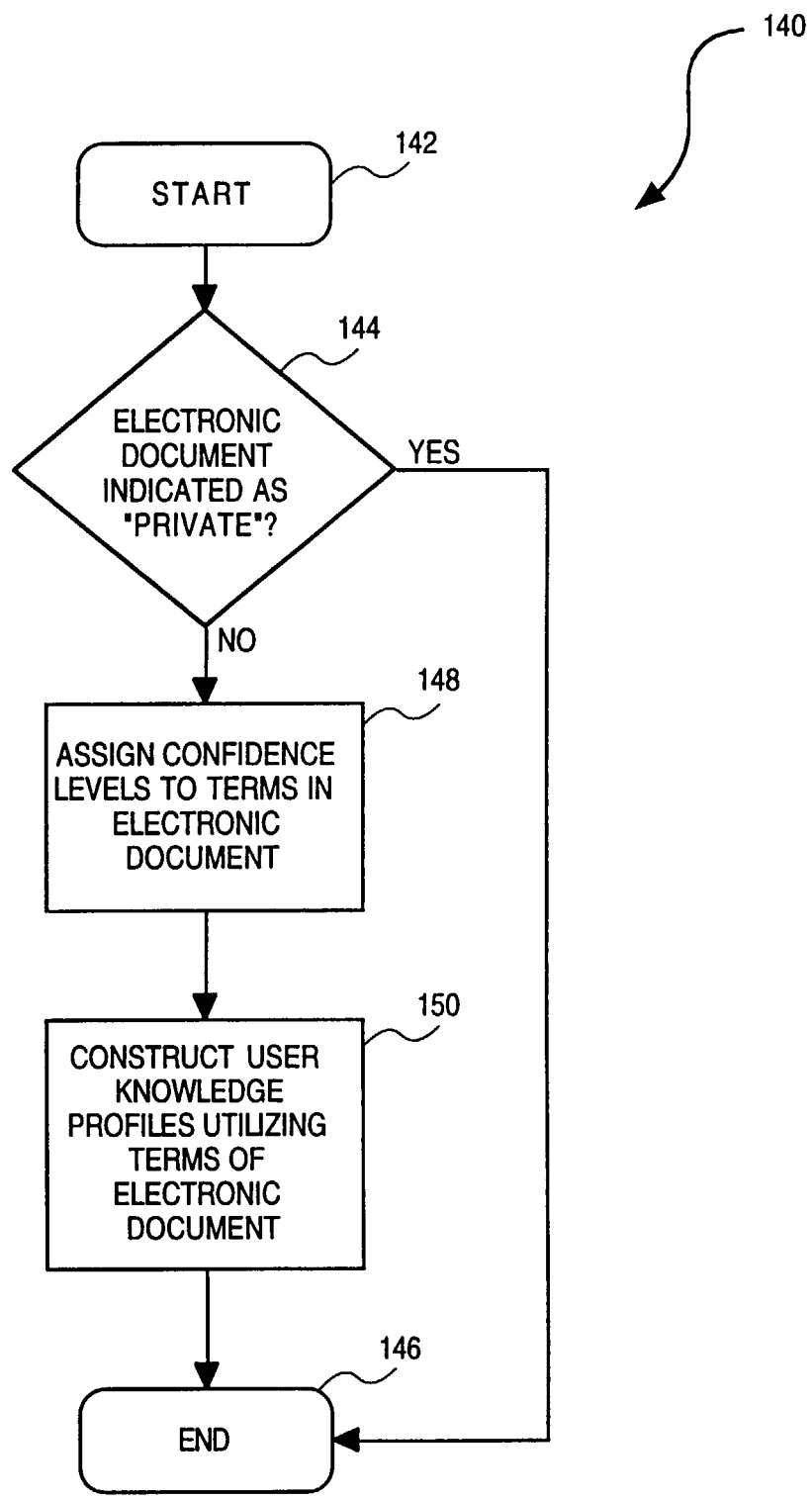
FIG. 7 is a flowchart illustrating a method, according to an exemplary embodiment of the present invention, of constructing a user knowledge profile.

Identification of Knowledge Terms and the Calculation of Associated Confidence Level Values FIG. 7 is a flow chart illustrating a method 140, according to an exemplary embodiment of the present invention, of constructing a user knowledge profile. FIG. 7 illustrates broad steps that are described in further detail with reference to subsequent flow charts and drawings. The method 140 commences at block 142, and proceeds to decision box 144, wherein a determination is made as to whether an electronic document, for example in the form of an e-mail propagated from an e-mail client 18, is indicated as being a private document. This determination may be made at the e-mail client 18 itself, at the e-mail server 23, or even within the knowledge site management server 27. This determination may furthermore be made by ascertaining whether the Ignore flag 86, incorporated within an e-mail message 85, is set to indicate the e-mail message 85 as private. As discussed above, the Ignore flag 86 may be set at a users discretion utilizing the profiling system 82, accessed via the user interface 80 within the extensions 19 to the e-mail client 18. In the event that the electronic document is determined to be private, the method 140 terminates at block 146, and no further processing of the electronic document occurs. Alternatively, the method 140 proceeds to block 148, where confidence level values are assigned to various terms within the electronic document. At block 150, a user knowledge profile is constructed utilizing the terms within the electronic document to which confidence level values were assigned at block 148. The method 140 then terminates at block 146.

Figure 8:
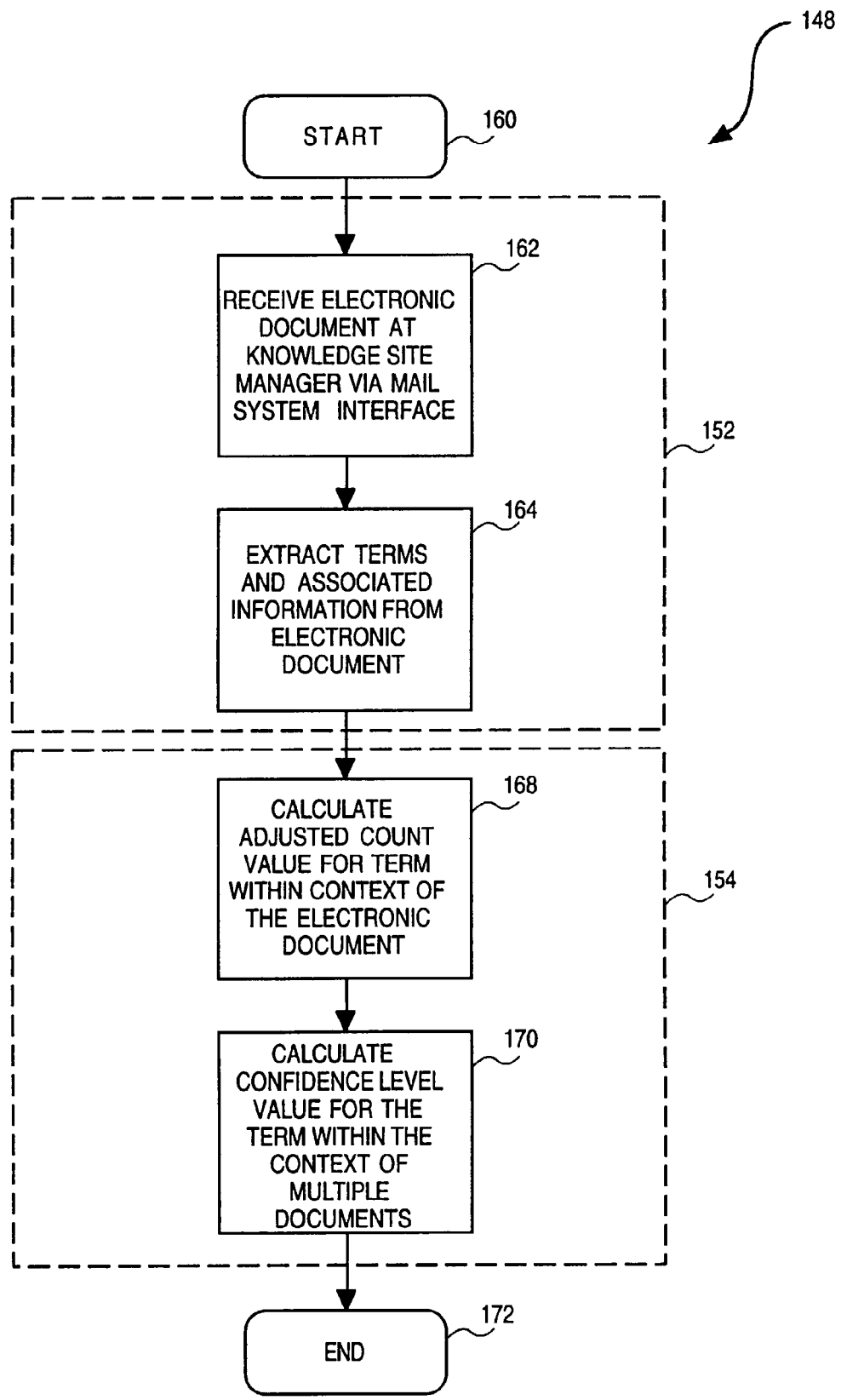
FIG. 8 is a flowchart illustrating a high-level method, according to an exemplary embodiment of the present invention, by which terms may be extracted from an electronic document and by which confidence level values may be assigned to such terms.

FIG. 8 is a flow chart illustrating a high-level method 148, according to an exemplary embodiment of the present invention, by which terms may be extracted from an electronic document, and by which confidence level values may be assigned such terms. The method 148 comprises two primary operations, namely a term extraction operation indicated at 152, and a confidence level value assigning operation, indicated at a 154. The method 148 implements one methodology by which the block 148 shown in FIG. 7 may be accomplished. The method 148 begins at block 160, and then proceeds to block 162, where an electronic document, such as for example an e-mail, a database query, a HTML document and or a database query, is received at the knowledge site management server 27 via the mail system interface 42. For the purposes of explanation, the present example will assume that an e-mail message, addressed to the KS mailbox 25, is received at the knowledge site management server 27 via the mail system interface 42, from the e-mail server 23. At block 164, terms and associated information are extracted from the electronic document. Specifically, the e-mail message is propagated from the mail system interface 42 to the term extractor 46, which then extracts terms in the form of, for example, grammar terms, noun phrases, word collections or single words from the e-mail message. The term extractor 46 may further parse a header portion of the e-mail to extract information therefrom that is required for the maintenance of both the repository and user databases 56B and 56A. For example, the term extractor 46 will identify the date of transmission of the e-mail, and all addressees. The term extractor 46 will additionally determine further information regarding the electronic document and terms therein. For example, the term extractor 46 will determine the total number of words comprising the electronic document, the density of recurring words within the document, the length of each term (i.e., the number of words that constitute the term), the part of speech that each word within the document constitutes, and a word type (e.g., whether the word is a lexicon term). To this end, the term extractor 46 is shown in FIG. 2 to have access to a database 49 of lexicon terms, which may identify both universal lexicon terms and environment lexicon terms specific to an environment within which the knowledge site management server 27 is being employed. For example, within a manufacturing environment, the collection of environment lexicon terms will clearly differ from the lexicon terms within an accounting environment.

Following the actual term extraction, a first relevancy indicator in the form of an adjusted count value is calculated for each term within the context of the electronic document at block 168. At block 170, a second relevancy indicator in the form of a confidence level is calculated for each term within the context of multiple electronic documents associated with a particular user. Further details regarding blocks 168 and 170 are provided below. The method 148 then terminates at block 172.

Figure 9A:
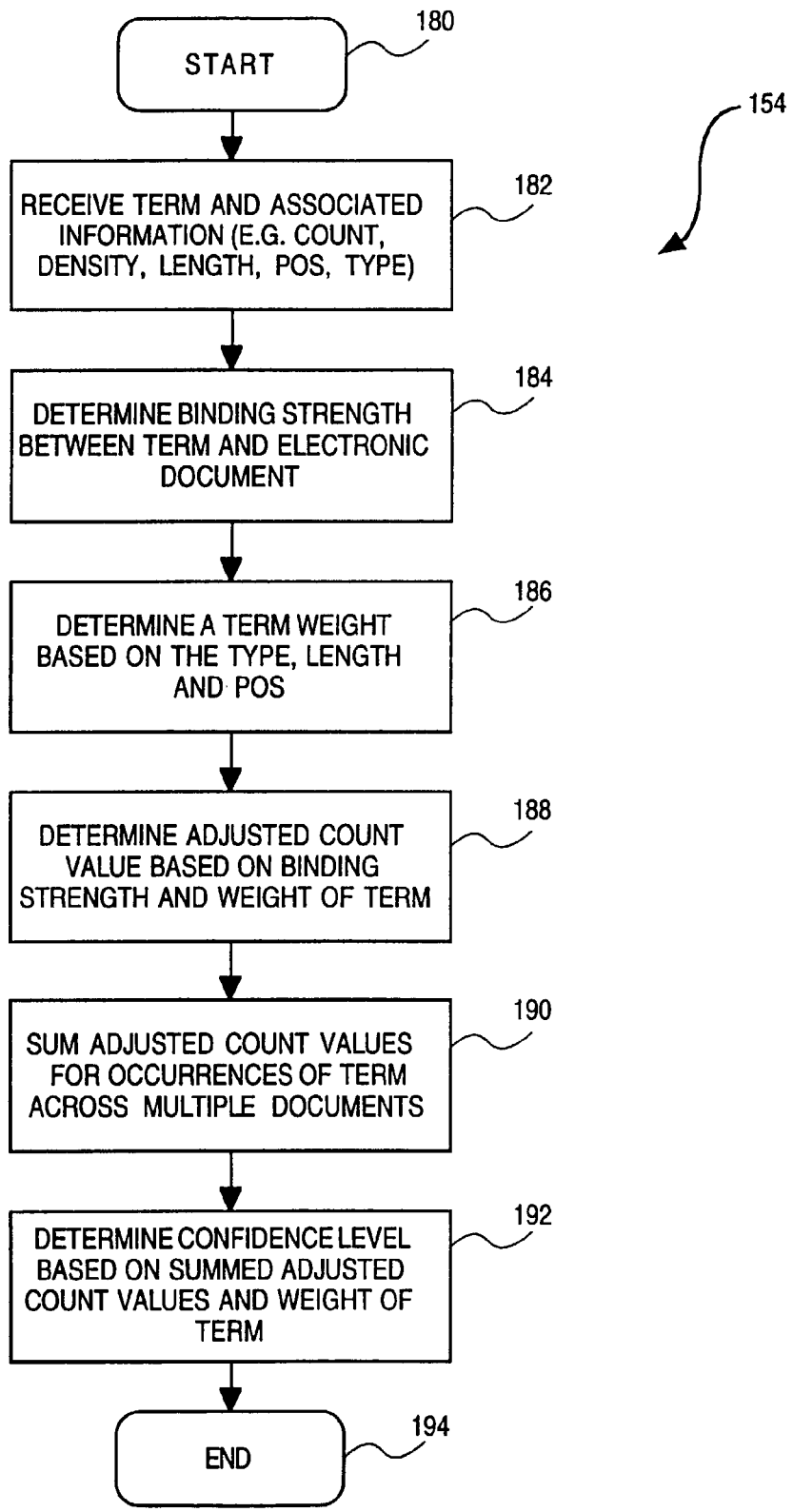
FIG. 9A is a flowchart illustrating a method, according to exemplary embodiment of the present invention, of determining a confidence level for a term extracted from an electronic document.

FIG. 9A is a flow chart illustrating a method 154, according to an exemplary embodiment of the present invention, of determining a confidence level for a term extracted from an electronic document. Following the commencement block 180, a term and associated information is received at the confidence logic 45, included within the term extractor 46. While the confidence logic 45 is shown to be embodied in the term extractor 46 in FIG. 2, it will be appreciated that the confidence logic 45 may exist independently and separately of the term extractor 46. In one embodiment, the associated information includes the following parameters:

1. A count value indicating the number of occurrences of the term within a single electronic document under consideration;
2. A density value, expressed as a percentage, indicating the number of occurrences of the term relative to the total number of terms within the electronic document;
3. A length of value indicating the total number of words included within the relevant term;
4. A Part of Speech indication indicating the parts of speech that words included within the term comprise (e.g., nouns, verbs, adjectives, or adverbs); and
5. A Type indication indicating whether the term comprises a universal lexicon term, an environment lexicon term, or is of unknown grammatical structure.

At block 184, a "binding strength", indicative of how closely the term is coupled to the electronic document under consideration, is determined. While this determination may be made in any number of ways, FIG. 10 shows an exemplary term-document binding table 200, utilizing which a class may be assigned to each of the extracted terms. Specifically, the term-document binding table 200 is shown to include three columns, namely a "number of occurrences" column 202, a density column 204, and an assigned class column 206. A term having a density value of greater than four percent, for example, is identified as falling in the "A" class, a term having a density of between two and four percent is identified as falling in the "B" class, a term having a density of between one and two percent is identified as falling in the "C" class, while a term having a density of between 0.5 and one percent is identified as falling in the "D class. For the terms having a density of above 0.5 percent, the density value is utilized to assign a class. For terms which have a density value less than 0.5 percent, the count value is utilized for this purpose. Specifically, a term having a count value of greater than 3 is assigned to the "E" class, and a term having a count value of between 1 and 3 is assigned to the "F" class. Accordingly, the assigned class is indicative of the "binding strength" with which the term is associated with or coupled to the electronic document under consideration.

At block 186, a characteristic (or qualitative) indicator in the form of a term weight value is determined, based on characteristics qualities of the term such as those represented by the Type and Part of Speech indications discussed above. While this determination may again be made in any number of ways, FIG. 11 shows an exemplary weight table 210, utilizing which a weight value may be assigned to each of the extracted terms. Specifically, the weight table 210 is shown to include four columns, namely a weight column 212, a type column 214, a length column 216 and a Part of Speech column 218. By identifying an appropriate combination of type, length and Part of Speech indications, an appropriate term weight value is assigned to each term. In the type column 214, a type "P" indication identifies an environment lexicon term, a type "L" indication identifies a universal lexicon term, and a type "U" indication identifies a term of unknown grammatical structure for a given length. The entries within the length column 216 indicate the number of words included within the term. The entries within the Part of Speech column 218 indicate the parts of speech that the words within a term comprise. The "A" indication identifies the adjectives, the "V" indication identifies a verb, the "N" indication identifies a noun, and the "X" indication identifies an unknown part of speech. By mapping a specific term to an appropriate entry within the weight table 210, an appropriate term weight value, as indicated in the weight column 212, may be assigned to the term.

Figure 12:
FIG. 12 illustrates an occurrence factor table, according to an exemplary embodiment of the present invention.

At block 188, a relevancy quantitative indicator in the form of an adjusted count value for each term, is calculated, this adjusted count value being derived from the binding strength and term weight values calculated at blocks 184 and 186. While this determination may again be made in any number of ways, FIG. 12 shows an exemplary occurrence factor table 220, utilizing which an adjusted count value for the relevant term may be determined. The occurrence factor table 220 is shown to include values for various binding strength/term weight value combinations. The adjusted count value is indicative of the importance or relevance of term within a single, given document, and does not consider the importance or relevance of the term in view of any occurrences of the term in other electronic documents that may be associated with a particular user.

At block 190, a determination is made as to whether any adjusted count values exists for the relevant term as a result of the occurrence of the term in previously received and analyzed documents. If so, the adjusted count values for occurrences of the term in all such previous documents are summed.

Figure 13:
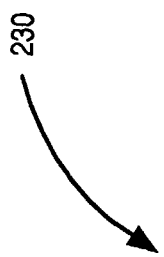
FIG. 13 illustrates a confidence level table, including initial confidence level values, according to an exemplary embodiment of the present invention.
Figure 14:
FIG. 14 illustrates a modified confidence level table, including modified confidence level values, according to an exemplary embodiment of the present invention.

At block 192, an initial confidence level values for the term is then determined based on the summed adjusted counts and the term weight, as determined above with reference to the weight table 210 shown in FIG. 11. To this end, FIG. 13 illustrates a confidence level table 230, which includes various initial confidence level values for various summed adjusted count/weight value combinations that may have been determined for a term. For example, a term having a summed adjusted count of 0.125, and a weight value of 300, may be allocated an initial confidence level value of 11.5. Following the determination of an initial confidence level value, confidence level values for various terms may be grouped into "classes", which still retain cardinal meaning, but which standardize the confidence levels into a finite number of "confidence bands". FIG. 14 illustrates a modified table 240, derived from the confidence level table 230, wherein the initial confidence levels assigned are either rounded up or rounded down to certain values. By grouping into classes by rounding, applications (like e-mail addressing), can make use of the classes without specific knowledge/dependence on the numerical values. These can then be tuned without impact to the applications. The modified confidence level values included within the table 240 may have significance in a number of applications. For example, users may request that terms with a confidence level of greater than 1000 automatically be published in a "public" portion of their user knowledge profile. Further, e-mail addressees for a particular e-mail may be suggested based on a match between a term in the e-mail and a term within the user knowledge profile having a confidence level value of greater than, merely for example, 600.

The method 154 then terminates at block 194.

Figure 9B:
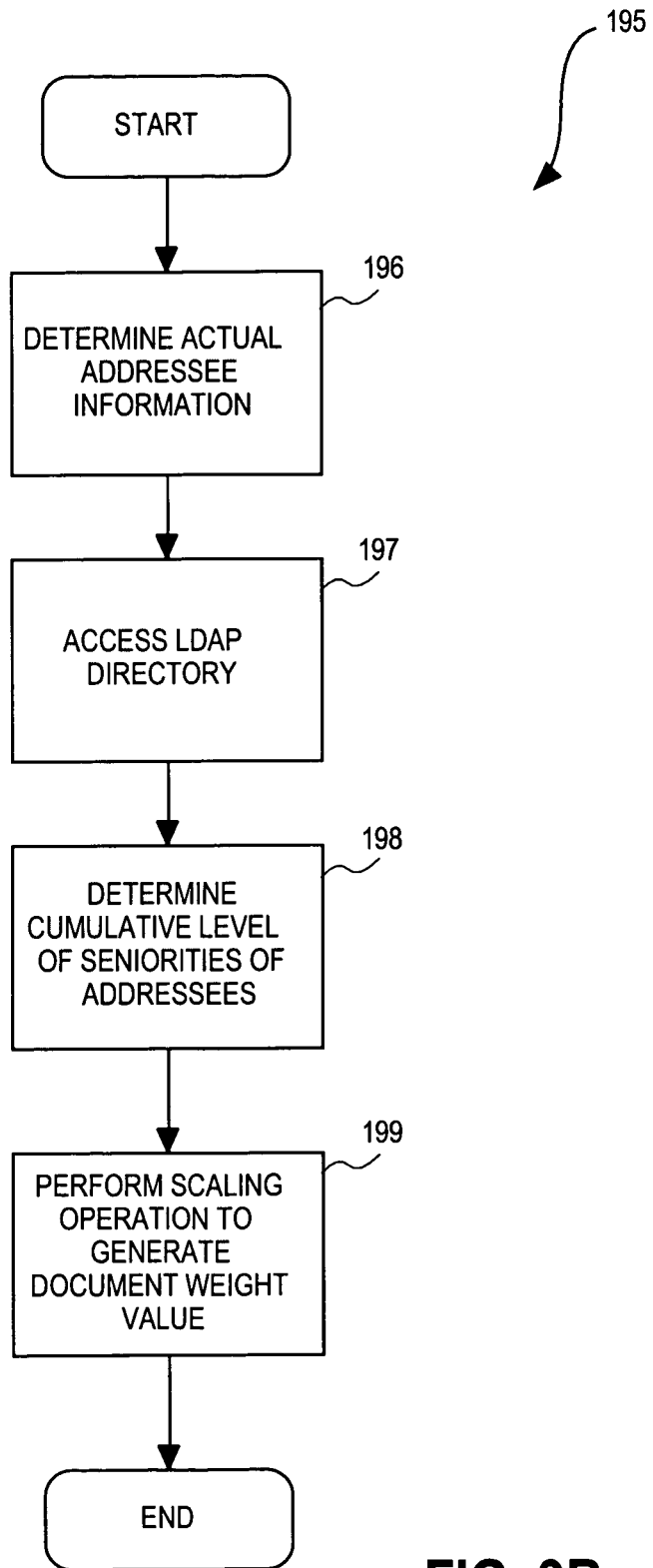
FIG. 9B is a flowchart illustrating a method, according to exemplary embodiment of the present invention, by which a document weight value may be assigned to a document based on addressee information associated with the document.

In a further embodiment of the present invention, the method 154, illustrated in FIG. 9A, may be supplemented by a number of additional blocks 195, as illustrated in FIG. 9B, by which a "document weight" value is assigned to a document based on addressee information associated with the document. The document weight value may be utilized in any one of the blocks 182-192 illustrated in FIG. 9A, for example, as a multiplying factor to calculate a confidence level value for a term. In one exemplary embodiment, the binding strength value, as determined at block 184, may be multiplied by the document weight value. In another exemplary embodiment, the term weight value, as determined at block 186, may be multiplied by the document weight value.

The document weight value may be calculated by the confidence logic 45 within the term extractor 46. Referring to FIG. 9B, at block 196, the confidence logic 45 identifies the actual addressee information. To this end, the term extractor 46 may include a header parser (not shown) that extracts and identifies the relevant addressee information. At block 197, the confidence logic 45 then accesses a directory structure that may be maintained by an external communication program for the purposes of determining the level of seniority within an organization of the addressees associated with the document. In one exemplary embodiment of the invention, the directory structure may be a Lightweight Directory Access Protocol (LDAP) directory maintained by a groupware server, such as Microsoft Exchange or Lotus Notes. At block 198, a cumulative seniority level for the various addressees is determined by summing seniority values for each of the addressees. At block 199, the summed seniority value is scaled to generate the document weight value. In this embodiment, the cumulative or summed seniority level of the various addressees comprises an "average" seniority value that is used for the purpose of calculating the document weight term. Alternatively, instead of summing in the seniority values at block 198, a "peak" seniority value (i.e., a seniority value based on the seniority level of the most senior addressee) may be identified and scaled at block 199 to generate the document weight value.

In alternative embodiments, the addressee information may be utilized in a different manner to generate a document weight value. Specifically, a document weight value may be calculated based on the number of addressees, with a higher number of addressees resulting in a greater document weight value. Similarly, a document weight value may be calculated based on the number of addressees who are included within a specific organizational boundary (e.g., a specific department or division). For example, an e-mail message addressed primarily to an executive group may be assigned a greater document weight value than an e-mail message addressed primarily to a group of subordinates. Further, the document weight value may also be calculated using any combination of the above discussed addressee information characteristics. For example, the document weight value could be calculated using both addressee seniority and addressee number information.

Construction of a User Knowledge Profile

Figure 15A:
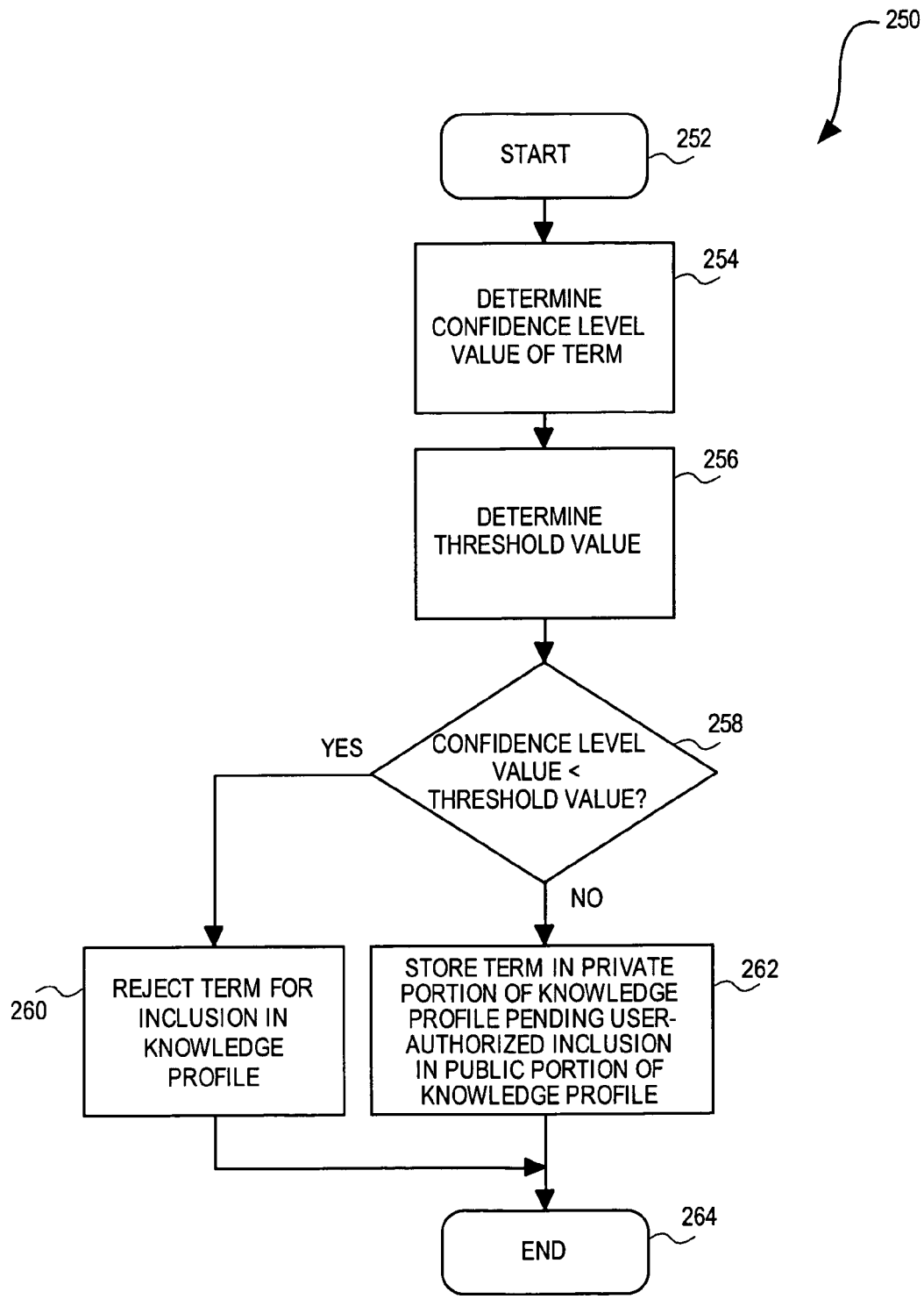
FIG. 15A is a flowchart illustrating a method, according to an exemplary embodiment of the present invention, of constructing a user knowledge profile that includes first and second portions.

FIG. 15A is a flow chart illustrating a method 250, according to one exemplary embodiment of the present invention, of constructing a user profile that includes first and second portions that may conveniently be identified as "private" and "public" portions. Specifically, unrestricted access to the "public" portion of the user knowledge profile may be provided to other users, while restricted access to the "private" portion may be facilitated. For example, unrestricted access may encompass allowing a user to review details concerning a user knowledge profile, and the target user, responsive to a specific request and without specific authorization from the target user. Restricted access, on the other hand, may require specific authorization by the target user for the provision of information concerning the user knowledge profile, and the target user, in response to a specific request. The method 250 commences at block 252, and then proceeds to block 254, where a determination is made regarding the confidence level value assigned to a term, for example using the method 154 described above with reference to FIG. 9A. Having determined the confidence level value, the method 250 proceeds to block 256, where a threshold value is determined. The threshold value may either be a default value, or a user specified value, and is utilized to ascertain the value of the relevant term. For example, users may set the threshold through the browser interface as a fundamental configuration for their profile. If set low, the user profile will be aggressively built. If set high, only terms with a high level of confidence will be included in the knowledge profile. Users can also elect to bypass the threshold publishing concept altogether, manually reviewing each term that crosses the threshold (via the notification manager) and then decide whether to publish. At decision box 258, a determination is made as to whether the confidence level value for the term is less than the threshold value. If so, this may be indicative of a degree of uncertainty regarding the term as being an accurate descriptor of a user's knowledge. Accordingly, at block 260, the relevant term is rejected for inclusion within the user knowledge profile. Alternatively, should the confidence level value be greater than the threshold value, this may be indicative of a greater degree of certainty regarding the term as an accurate descriptor of a user's knowledge, and the relevant term is then stored, as a default condition, in the "private" portion of the user's knowledge profile at block 262. The allocation of the term to the private portion is made pending user-review and possible elevation to the public portion, should the user wish to provide a public view of this term. The method 150 then terminates at block 264.

Figure 16A:
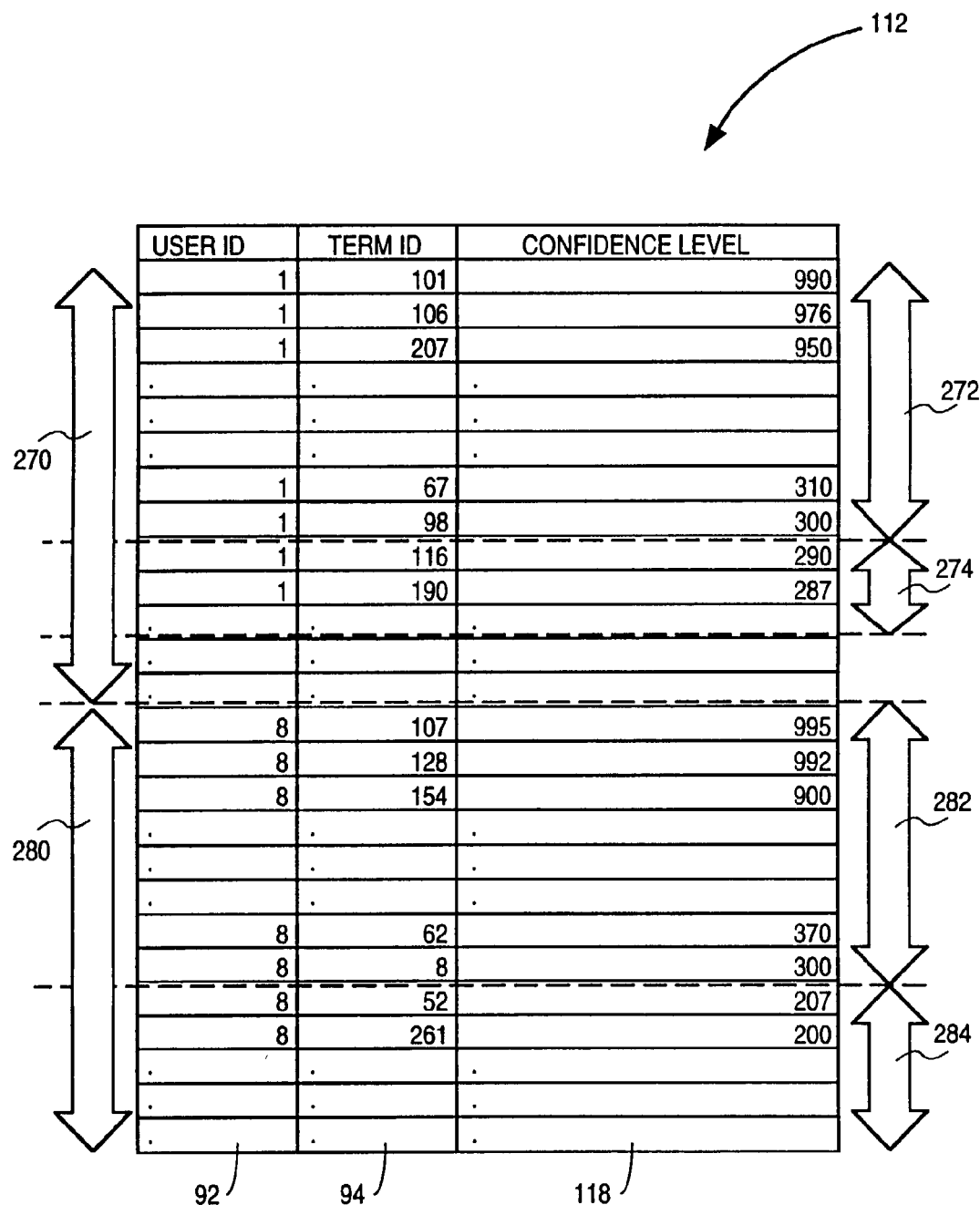
FIG. 16A illustrates a user-term table, constructed according to the exemplary method illustrated in FIG. 15A.

FIG. 16A shows an exemplary user-term table 112, constructed according to the method 250 illustrated in FIG. 15A. Specifically, the table 112 is shown to include a first user knowledge profile 270 and a second user knowledge profile 280. The first user knowledge profile 270 is shown to include a "public" portion 272, and a "private" portion 274, the terms within the "private" portion 274 having an assigned confidence level value (as indicated in the confidence level column 118) below a threshold value of 300. The second user knowledge profile 280 similarly has a "public" portion 282 and a "private" portion 284.

Figure 16B:
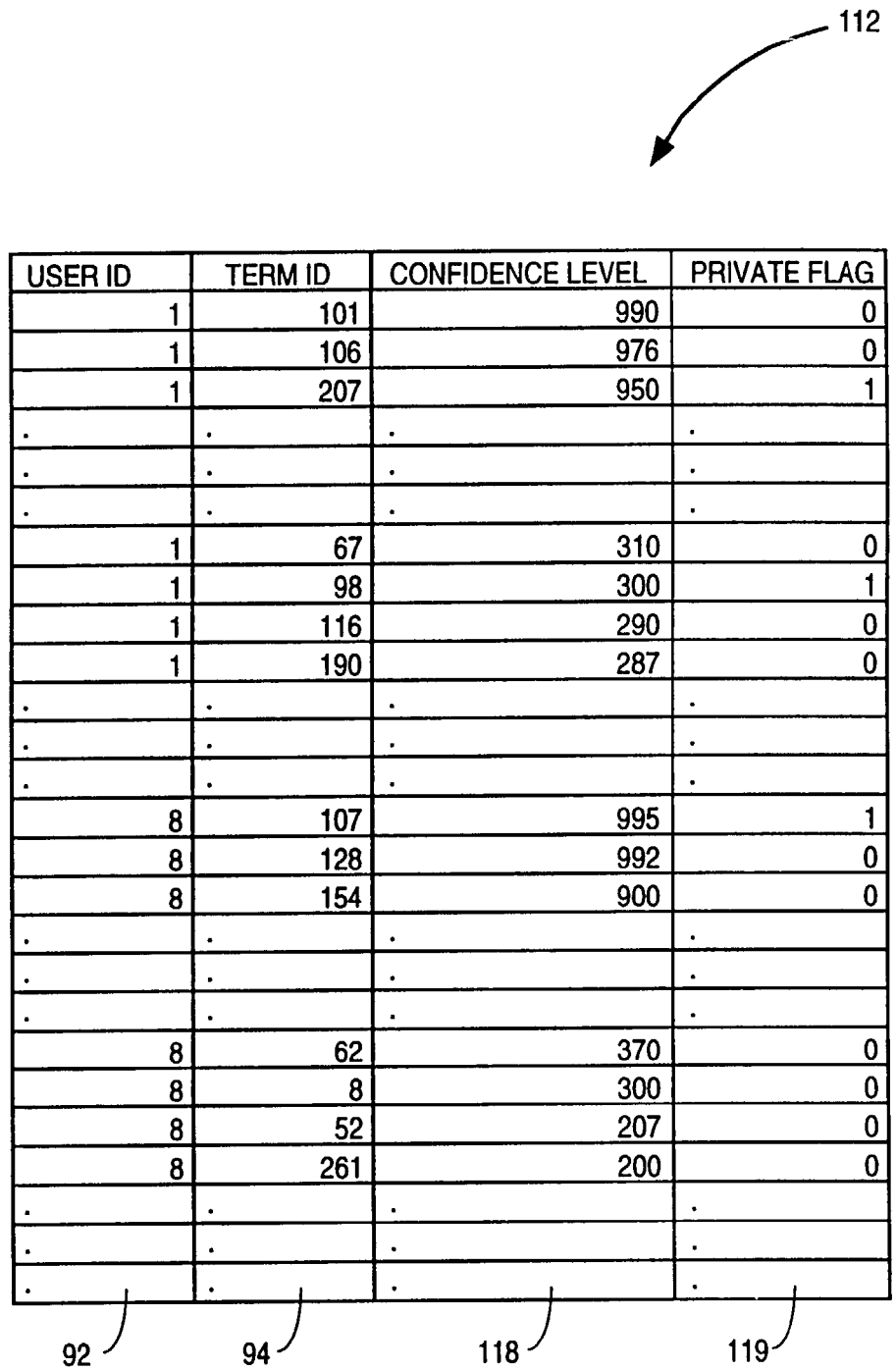
FIG. 16B illustrates a user-term table, constructed according to the exemplary method illustrated in FIG. 15A.

The exemplary user-term table 112 shown in FIG. 16A comprises an embodiment of the table 112 in which the public and private portions are determined dynamically with reference to a confidence level value assigned to a particular user-term pairing. FIG. 16B illustrates an alternative embodiment of the user-term table 112 that includes a "private flag" column 119, within which a user-term pairing may be identified as being either public or private, and accordingly part of either the public or private portion of a specific user profile. While the state of a private flag associated with a particular user-term pairing may be determined exclusively by the confidence level associated with the pairing, in an alternative embodiment of the invention, the state of this flag may be set by other mechanisms. For example, as described in further detail below with reference to FIG. 17E, a user may be provided with the opportunity manually to modify the private or public designation of a term (i.e., move a term between the public and private portions of a user knowledge profile). A user may be provided with an opportunity to modify the private or public designation of a term in response to a number of events. Merely for example, a user may be prompted to designate a term as public in response to a "hit" upon a term in the private portion during a query process, such as during an "expert-lookup" query or during an "addressee-lookup" query. When storing the term in the user knowledge profile at either blocks 260 or 262, the allocation of the term to the appropriate portion may be made by setting a flag, associated with the term, in the "private flag" column 119 within the user-term table 112, as illustrated in FIG. 16B. For example, a logical "1" entry within the "private flag" column 119 may identify the associated term as being in the "private" portion of the relevant user knowledge profile, while a logical "0" entry within the "private flag" column 119 may identify the associated term as being in the "public" portion of the relevant user knowledge profile.

Figure 15B:
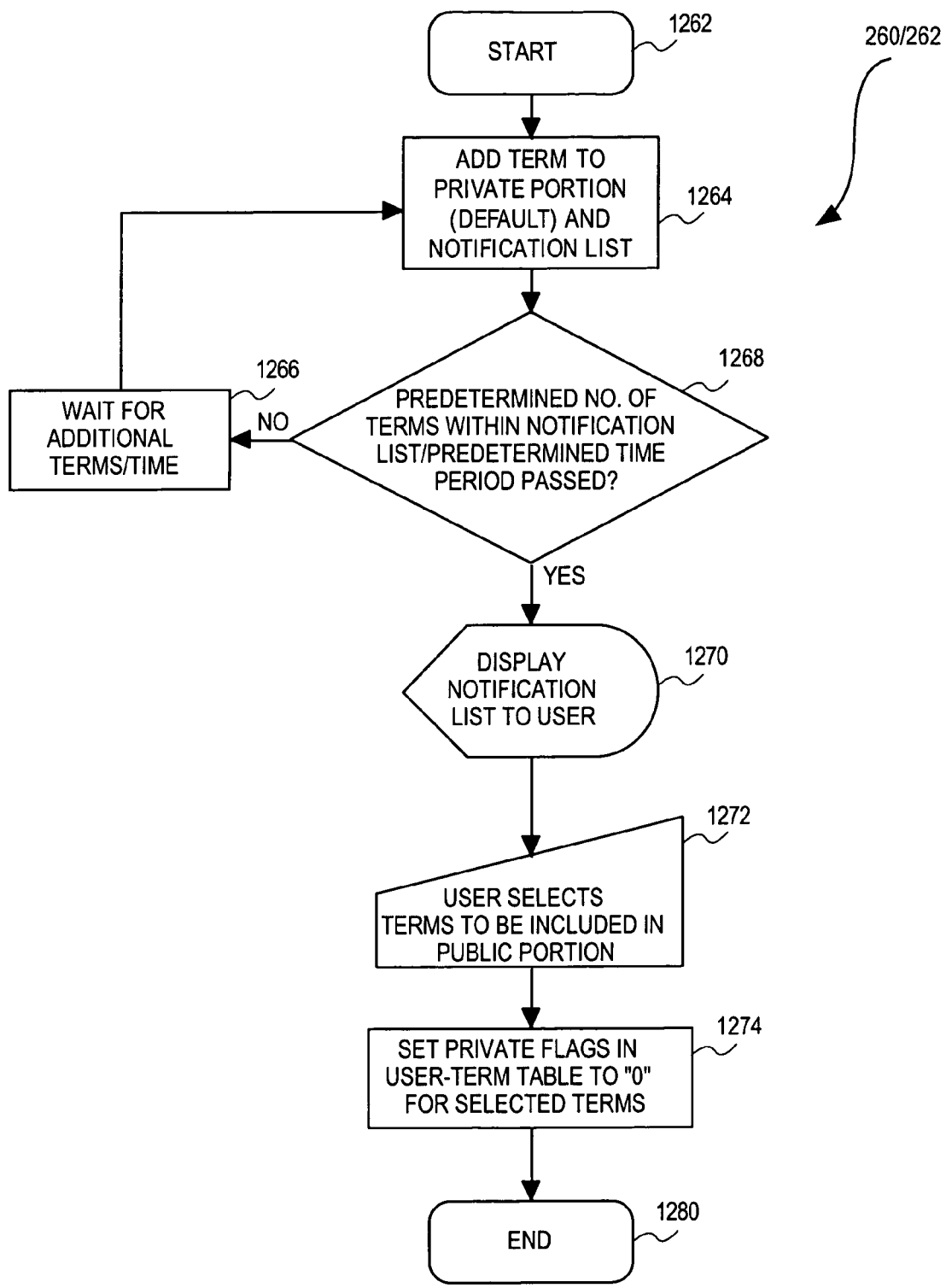
FIG. 15B is a flowchart illustrating a method, according to an exemplary embodiment of the present invention, of storing a term in either a first or a second portion of a user knowledge profile.

FIG. 15B illustrates an exemplary method 260/262, according to one embodiment of the present invention, of storing a term in either a public or private portion of a user knowledge profile. Specifically, a respective term is, as a default condition, included in the private portion of a user knowledge profile and also added to a notification list at block 1264, following the determination made at decision box 258, as illustrated in FIG. 15A. In one embodiment, as a default operation, private flags within the "private flag" column 119 of the user-term table 112 are set to a logical one (1) to indicate that the terms are included in the private portion of the user knowledge profile. The addition of the respective terms to the private portion of a user knowledge profile as a default condition insures that the relevant user retains control of terms that are published by the public portion of the user knowledge profile. The notification list may accordingly include terms that have been newly-added to the private portion of the user knowledge profile.

At decision box 1268, a determination is made as to whether a predetermined number of terms have been accumulated within the notification list, or whether a predetermined time period has passed. If these conditions are not met, the method waits for additional terms to be added to the notification list, or for further time to pass, at block 1266, before looping back to the block 1264. On the other hand, should a condition within the decision box 1268 have been met, the method proceeds to block 1270, where the notification list, which includes a predetermined number of terms that are to be added to the private portion of the user knowledge profile, is displayed to a user. The notification list may be provided to the user in the form of an e-mail message, or alternatively the user may be directed to a web site (e.g., by a URL included within e-mail message) that displays the notification list. In yet a further embodiment, the notification list may be displayed on a web or intranet page that is frequently accessed by the user, such as a home page. At block 1272, the user then selects terms that are to be included in the public portion of the user knowledge profile. For example, the user may select appropriate radio buttons (or check-boxes) displayed alongside the various terms within the notification list to identify terms to be included in the public portion of the user knowledge profile. At block 1274, private flags, such as those contained within the "private flag" column 119 of the user-term table 112 as shown in FIG. 16B, are set to a logical zero "0" to indicate that the terms selected by the user are included within the public portion. It will of course appreciated that, for terms not selected by a user at block 1272, the private flags remain set to a logical one (1) to indicate these terms as belonging to the private portion.

The above described method is advantageous in that a user is not required to remember routinely to update his or her user profile, but is instead periodically notified of terms that are candidates for inclusion within his or her user knowledge profile. Upon notification, the user may select terms for inclusion within the public portion of the user knowledge profile. As such, the method may be viewed as a "push" model for profile maintenance.

Method of Accessing a User Knowledge Profile

Figure 17A:
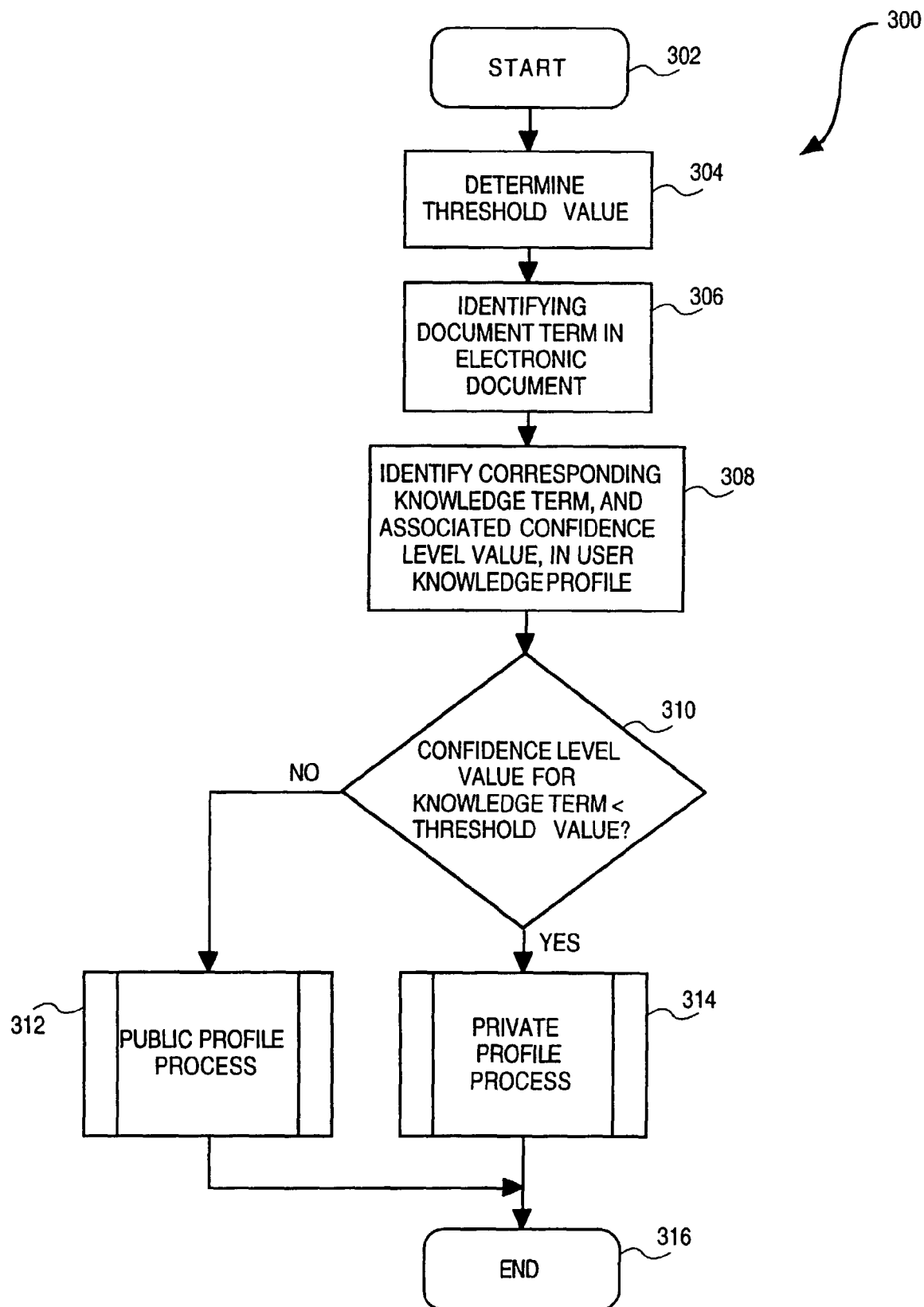
FIG. 17A is a flowchart illustrating a method, according to an exemplary embodiment of the present invention, of facilitating access to a user knowledge profile.

While the above method 250 is described as being executed at the time of construction of a user knowledge profile, it will readily be appreciated that the method may be dynamically implemented as required and in response to a specific query, with a view to determining whether at least a portion of a user knowledge profile should be published, or remain private responsive to the relevant query. To this end, FIG. 17A shows a flow chart illustrating a method 300, according to one exemplary embodiment of the present invention, of facilitating access to a user knowledge profile. The method 300 commences at block 302, and then proceeds to block 304, where a threshold value is determined. At block 306, a document term within an electronic document generated by a user (hereinafter referred to as a "query" user) is identified. Block 306 is performed by the term extractor 46 responsive, for example, to the receipt of an e-mail from the mail system interface 42 within the knowledge gathering system 28. At block 308, comparison logic 51 within the term extractor 46 identifies a knowledge term within the repository 50 corresponding to the document term identified at block 306. The comparison logic 51 also determines a confidence level value for the identified knowledge term. At decision box 310, the comparison logic 51 makes a determination as to whether the confidence level value for the knowledge term identified at block 308 is less than the threshold value identified at block 304. If not (that is the confidence level value is greater than the threshold value) then a public profile process is executed at block 312. Alternatively, a private profile process is executed at block 314 if the confidence level value falls below the threshold value. The method 300 then terminates at block 316.

Figure 17B:
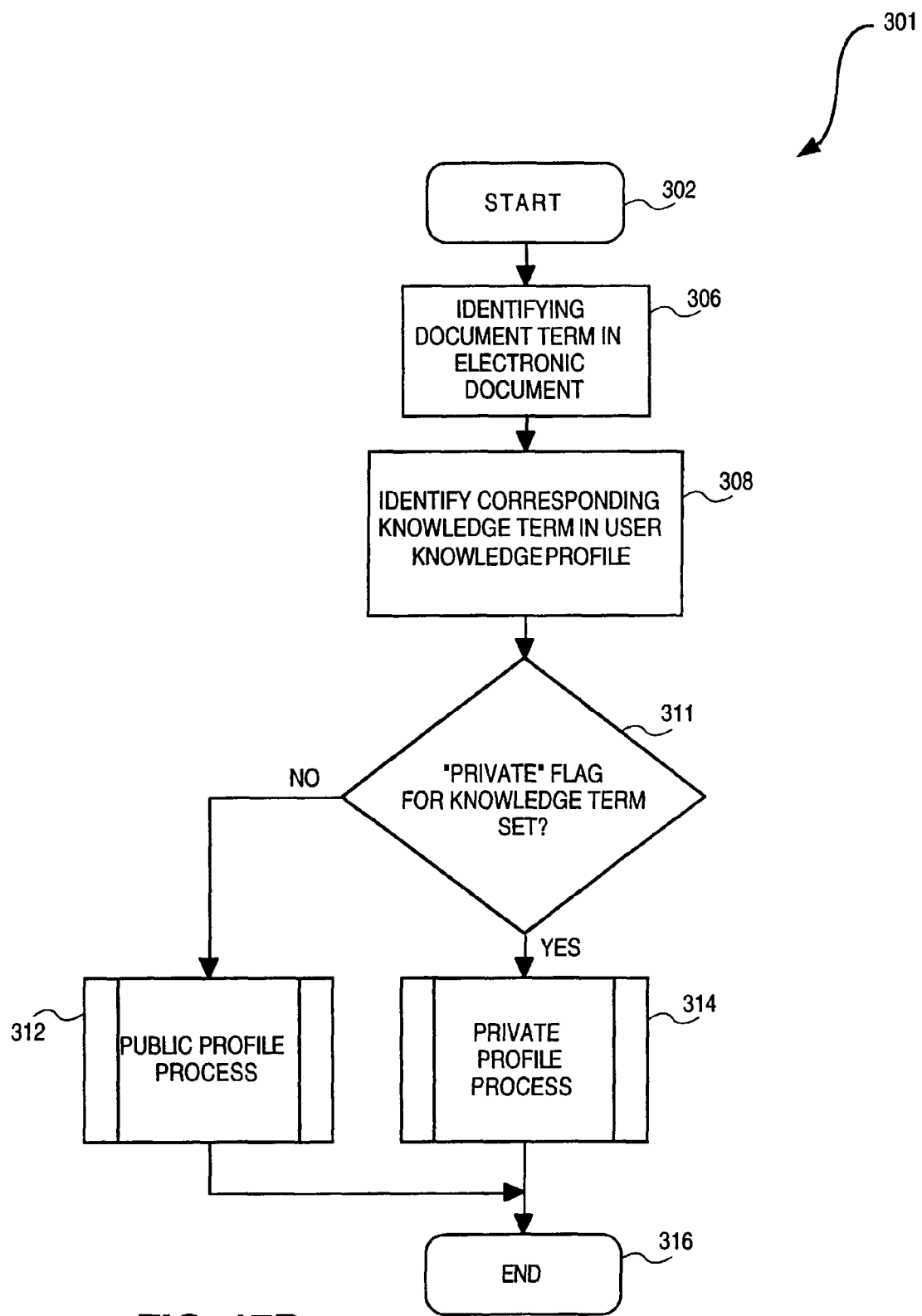
FIG. 17B is a flowchart illustrating an alternative method, according to exemplary embodiment of the present invention, of facilitating access to a user knowledge profile.

FIG. 17B shows a flowchart illustrating an alternative method 301, according to an exemplary embodiment of the present invention, of facilitating access to a user knowledge profile. The method 301 commences at block 302, and then proceeds to block 306, where a document term within an electronic document generated by a user (i.e., the "query" user) is identified. The term extractor 46 performs block 306 responsive, for example, to the receipt of an e-mail message from the mail system interface 42 within the knowledge gathering system 28. At block 308, the comparison logic 51 within the term extractor 46 identifies a knowledge term within the knowledge repository 50 corresponding to the document term identified at block 306. At decision box 311, the comparison logic 51 then makes a determination as to whether a "private" flag for the knowledge term is set to indicate the relevant knowledge term as being either in the public or the private portion of a user knowledge profile. Specifically, the comparison logic 51 may examine the content of an entry in the private flag column 112 of a user-term table for a specific user-term pairing of which the knowledge term is a component. If the "private" flag for the knowledge term is set, thus indicating the knowledge term as being in the private portion of a user knowledge profile, the private profile process is executed at block 314. Alternatively, the public profile process is executed at block 312. The method 301 then terminates at block 316.

Figure 17C:
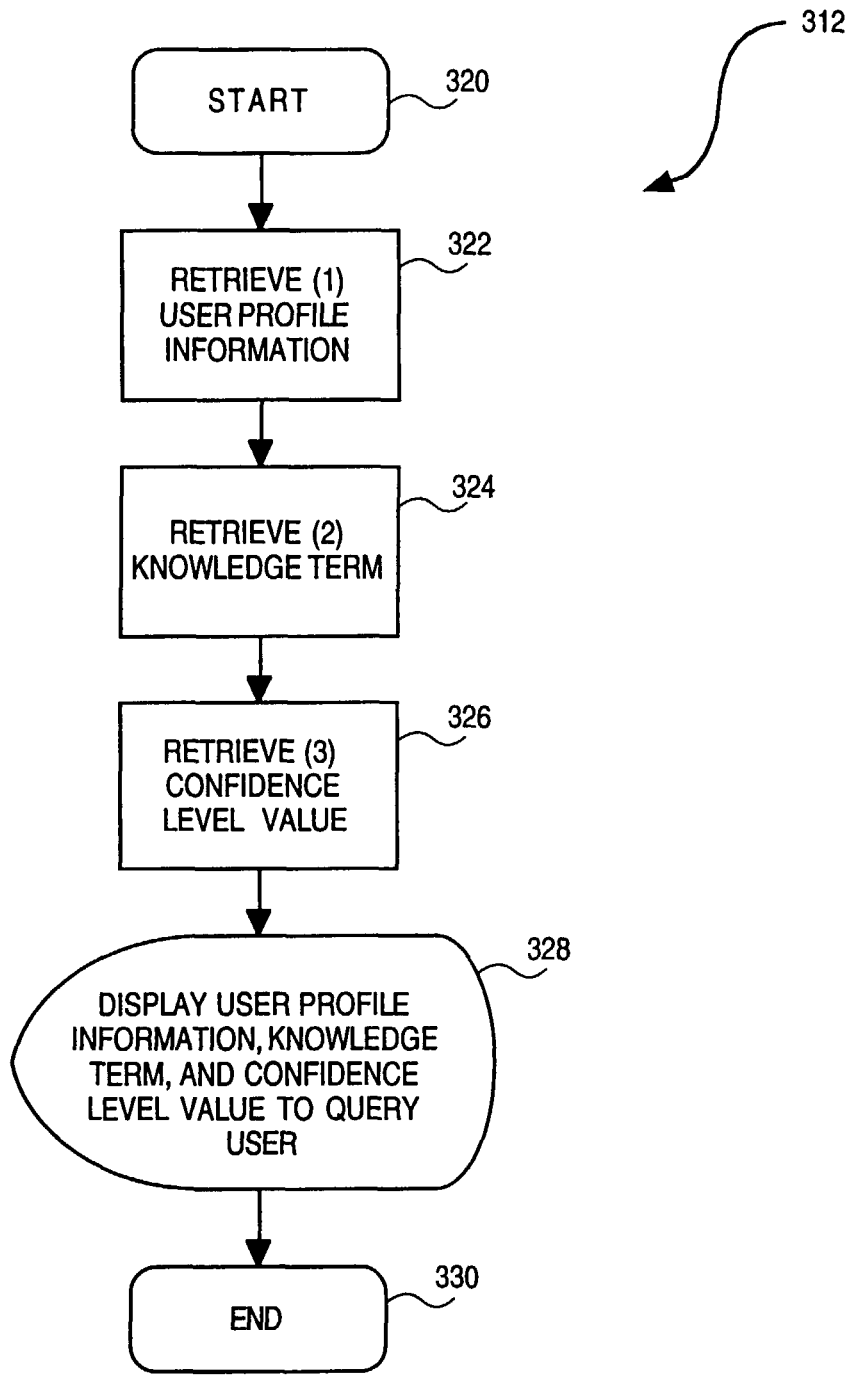
FIG. 17C is a flowchart illustrating a method, according to exemplary embodiment of the present invention, of performing a public profile process.

FIG. 17C shows a flow chart detailing a method 312, according to an exemplary embodiment of the present invention, of performing the public profile process mentioned in FIGS. 17A and 17B. The method 312 commences at block 320, and user information, the knowledge term corresponding to the document term, and the confidence level value assigned to the relevant knowledge term are retrieved at blocks 322, 324, and 326. This information is then displayed to the query user at block 328, whereafter the method 312 terminates at block 330.

Figure 17D:
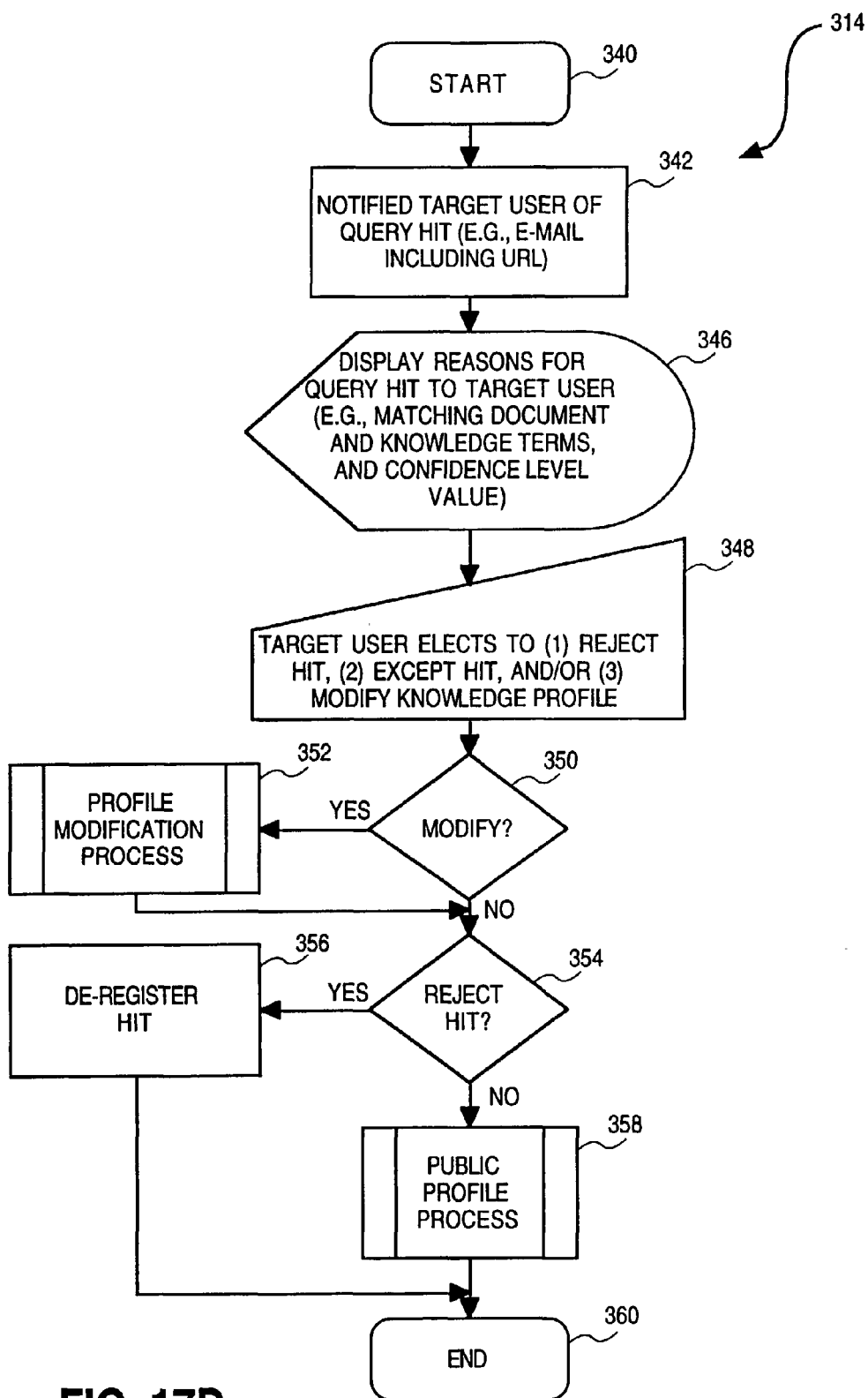
FIG. 17D is a flowchart illustrating a method, according to an exemplary embodiment of the present invention, of performing a private profile process.
Figure 17E:
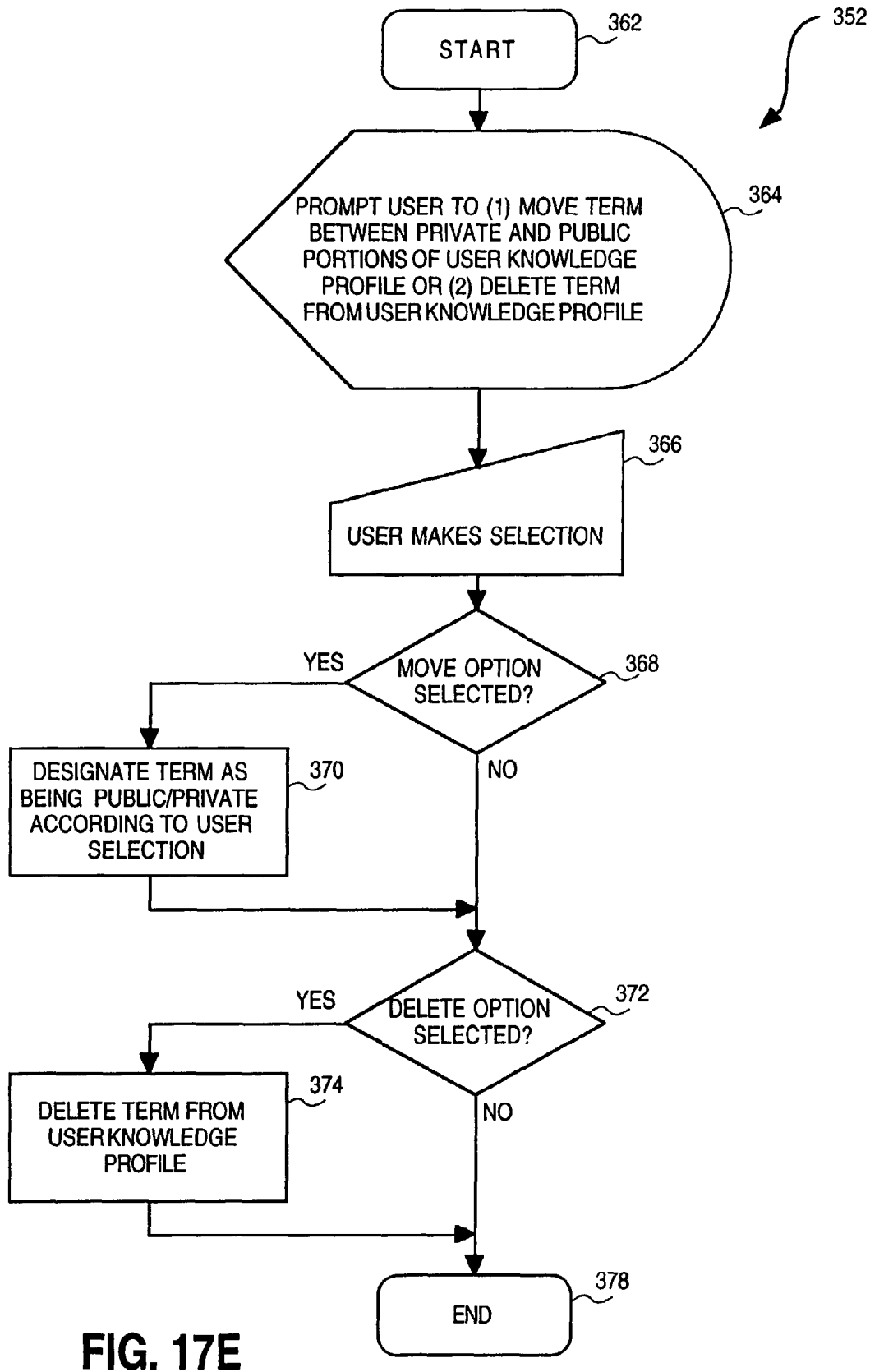
FIG. 17E is a flowchart illustrating a method, according to an exemplary embodiment of the present invention, of performing a profile modification process.

FIG. 17D shows a flow chart detailing a method 314, according to an exemplary embodiment of the present invention, of performing the private profile process mentioned in FIGS. 17A and 17B. The method 314 commences at block 340, and proceeds to block 342, where a user (herein after referred to as the "target" user) who is the owner of the knowledge profile against which the hit occurred is notified of the query hit. This notification may occur in any one of a number of ways, such as for example via an e-mail message. Such an e-mail message may further include a URL pointing to a network location at which further information regarding the query hit, as well as a number of target user options, may be presented. At block 346, the reasons for the query hit are displayed to the target user. Such reasons may include, for example, matching, or similar, document and knowledge terms utilizing which the hit was identified and the confidence level value associated with the knowledge term. These reasons may furthermore be presented within the e-mail propagated at block 342, or at the network location identified by the URL embedded within the e-mail. At block 348, the target user then exercises a number of target user options. For example the target user may elect to reject the hit, accept the hit, and/or modify his or her user knowledge profile in light of the hit. Specifically, the target user may wish to "move" certain terms between the public and private portions of the user knowledge profile. Further, the user may optionally delete certain terms from the user knowledge profile in order to avoid any further occurrences of hits on such terms. These target user options may furthermore be exercised via a HTML document at the network location identified by the URL. At decision box 350, a determination is made as to whether the user elected to modify the user knowledge profile. If so, a profile modification process, which is described below with reference to FIG. 17E, is executed at block 352. Otherwise, a determination is made at decision box 354 as to whether the target user rejected the hit. If so, the hit is de-registered at block 356. Alternatively, if the target user accepted the hit, the public profile process described above with reference to FIG. 17C is executed at block 358. The method 314 then terminates at block 360.

FIG. 17E is a flowchart illustrating a method 352, according to an exemplary embodiment of the present invention, for implementing the profile modification process illustrated at block 352 in FIG. 17D. The method 352 commences at block 362, and then proceeds to display block 364, where the target user is prompted to (1) move a term, on which a "hit" has occurred, between the private and public portions of his or her user knowledge profile, or to (2) delete the relevant term from his or her user knowledge profile. Specifically, the target user may be presented with a user dialog, a HTML-enriched e-mail message, or a Web page, listing the various terms upon which hits occurred as a result of an inquiry, besides which appropriate buttons are displayed that allow the user to designate the term either to the included in the public or private portion of his or her user knowledge profile, or that allow the user to mark the relevant term for deletion from the user knowledge profile. At input block 366, the target user makes selections regarding the terms in the matter described above. At decision box 368, a determination is made as to whether the user selected terms for transfer between the public and private portions of the user profile, or for inclusion within the user profile. If so, the method 352 proceeds to block 370, wherein the appropriate terms are designated as being either public or private, in accordance with the user selection, by setting appropriate values in the "private flag" column 119 within the user-term table, as illustrated in FIG. 16B. Thereafter, the method proceeds to decision box 372, wherein a determination is made as to whether the user has elected to delete any of the terms presented at block 364. If so, the relevant terms are deleted from the user knowledge profile at block 374. The method is then terminates at block 378.

The methodologies described above with reference to FIGS. 15 through 17E are advantageous in that, where the confidence level of a term falls below a predetermined threshold, the owner of the user knowledge profile may elect to be involved in the process of determining whether a query hit is accurate or inaccurate. The owner of the user knowledge profile is also afforded the opportunity to update and modify his or her knowledge profile as and when needed. Further, the owner of the user knowledge profile is only engaged in the process for hits below a predetermined certainty level and on a public portion of the knowledge profile. Matches between document terms and knowledge terms in the public portion are automatically processed, without any manual involvement.

Method for Addressing an Electronic Document for Transmission Over a Network

Returning now briefly to FIG. 5, the addressing system 84 within the e-mail client extensions 19 operates independently of the profiling system 82 to suggest potential recipients for an e-mail message based on the content thereof. The user interface 80 within the e-mail client extensions 19 may pop-up a window when the system determines such suggestion is possible, based on the length of a draft message being sent, or may present a command button labeled "Suggest Recipients". This button is user selectable to initiate a sequence of operations whereby the author of the e-mail is presented with a list of potential recipients who may be interested in receiving the e-mail based on predetermined criteria, such as a match between the content of the e-mail and a user profile, or a commonality with a confirmed addressee.

Figure 18A:
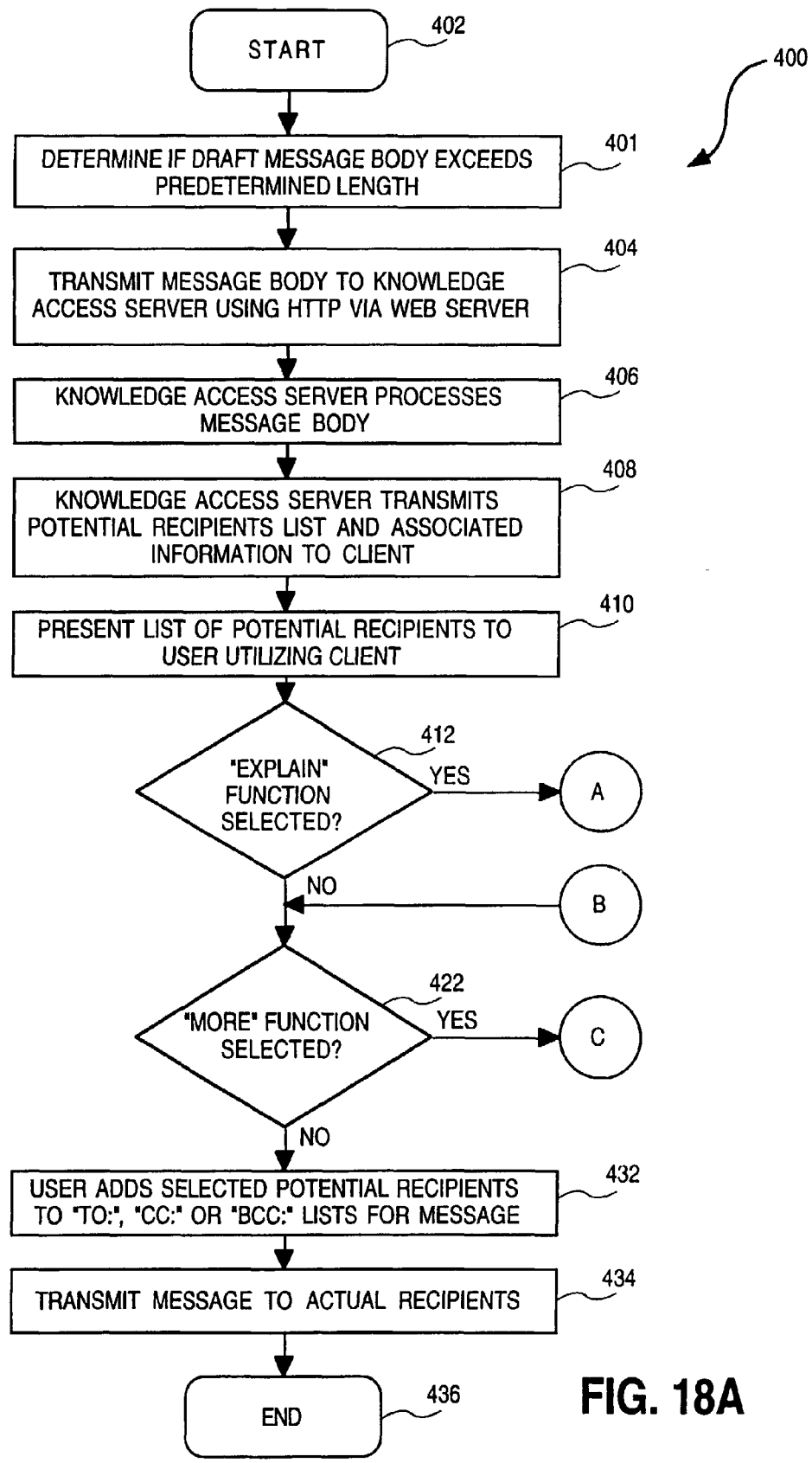
FIG. 18A is a flowchart illustrating a method, according to an exemplary embodiment of the present invention, of addressing an electronic document for transmission over a computer network.

FIG. 18A is a flow chart illustrating a method 400, according to an exemplary embodiment of the present invention, of addressing an electronic document, such as an e-mail, for transmission over a network, such as the Internet or an Intranet. The method 400 commences at block 402, and then proceeds to block 401, where a determination is made as to whether the body of the draft message exceeds a predetermined length (or number of words). If so, content of the electronic document (e.g., an e-mail message body) is transmitted to the knowledge access server 26 via the web server 20 at block 404. Specifically, a socket connection is open between the e-mail client 18 and the web server 20, and the content of the message body, which may still be in draft form, is transmitted using the Hypertext Transfer Protocol (HTTP) via the web server 20 to the knowledge access server 26. At block 406, the knowledge access server 26 processes the message body, as will be described in further detail below. At block 408, the knowledge access server 26 transmits a potential or proposed recipient list and associated information to the addressing system 84 of the e-mail client 18. Specifically, the information transmitted to the e-mail client 18 may include the following:

1. A list of user names, as listed within column 94 of the user table 90, as well as corresponding e-mail addresses, as listed within the column 98 of the user table 90;
2. A list of term identifiers, as listed in column 116 of the user-term table 112, that were located within the "public" portion of a user knowledge profile that formed the basis for a match between document terms within the message body and knowledge terms within the user knowledge profile; and
3. A "matching metric" for each user included in the list of user names (1). Each "matching metric" comprises the sum of the confidence level values, each multiplied by the weighted occurrences of the term within the message body, for the terms identified by the list of term identifiers (2) and associated with the relevant user. This "matching metric" is indicative of the strength of the recommendation by the knowledge access server 26 that the relevant user (i.e., potential recipient) be included within the list of confirmed addressees.

Figure 18B:
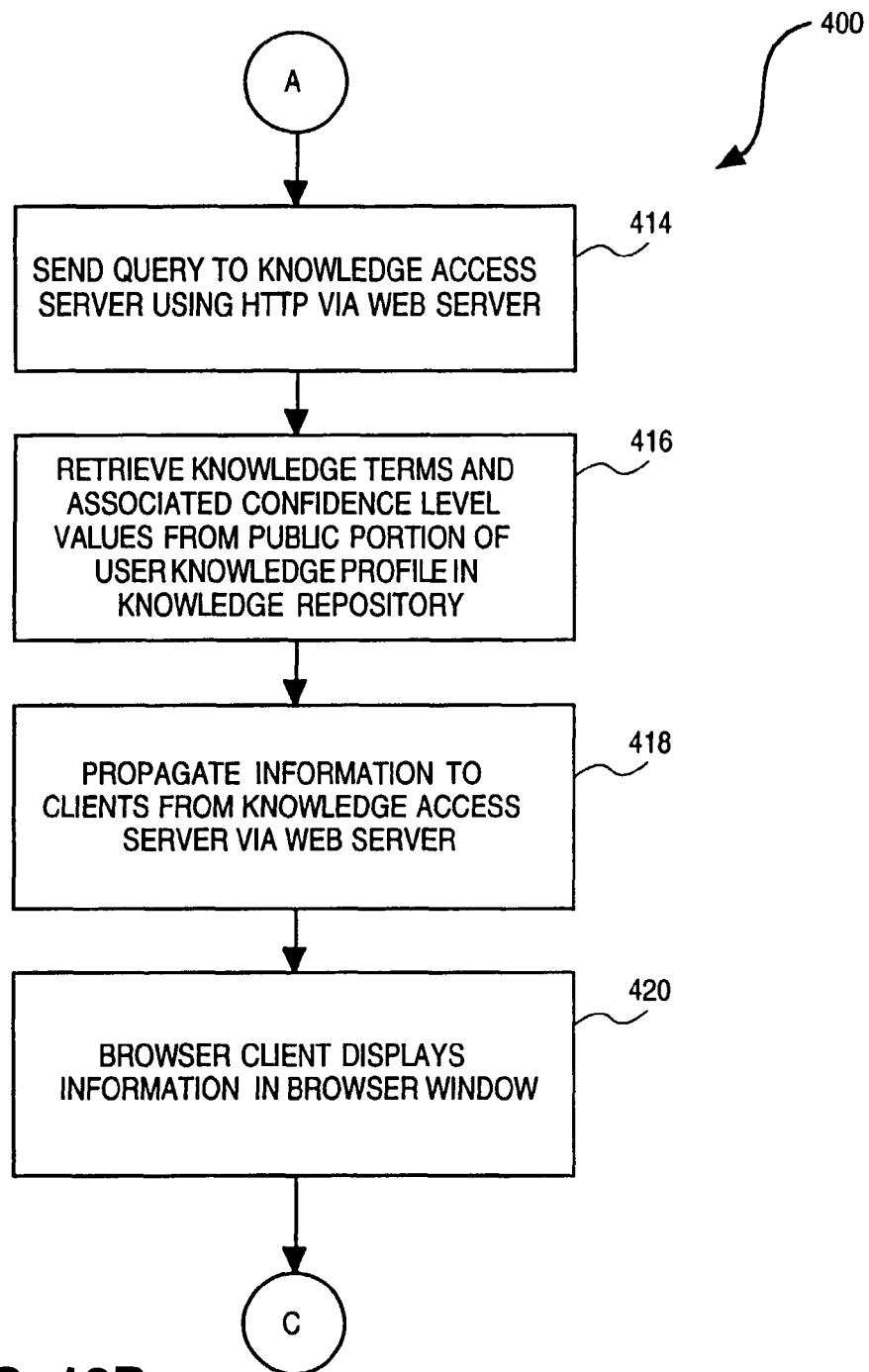
FIG. 18B is a flowchart illustrating a method, according to an exemplary embodiment of the present invention, of executing an "explain" function that provides the reasons for the proposal of an e-mail recipient.
Figure 18C:
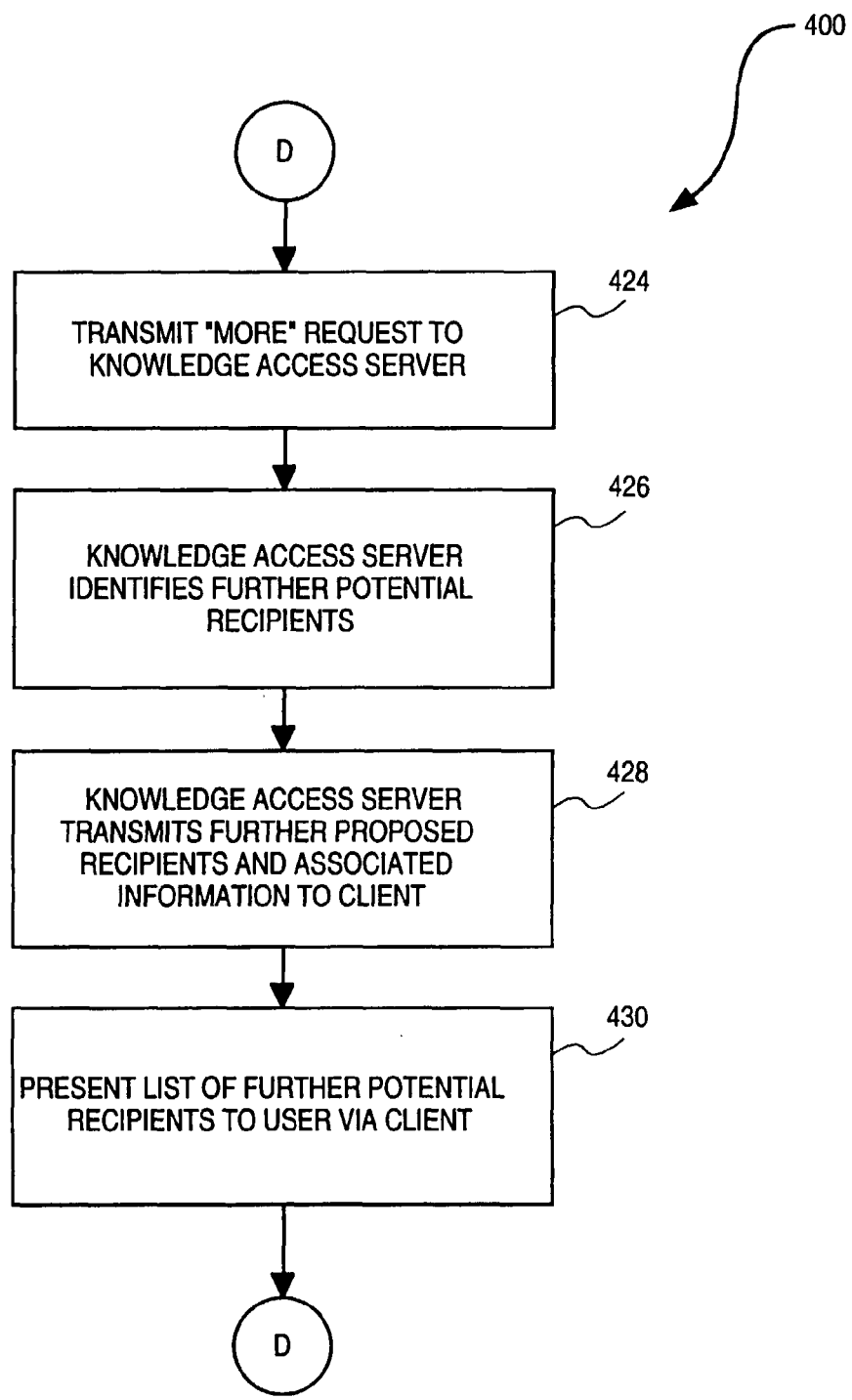
FIG. 18C is a flowchart illustrating a method, according to an exemplary embodiment of the present invention, of executing a "more" function that proposes further potential recipients for an e-mail message.
Figure 18D:
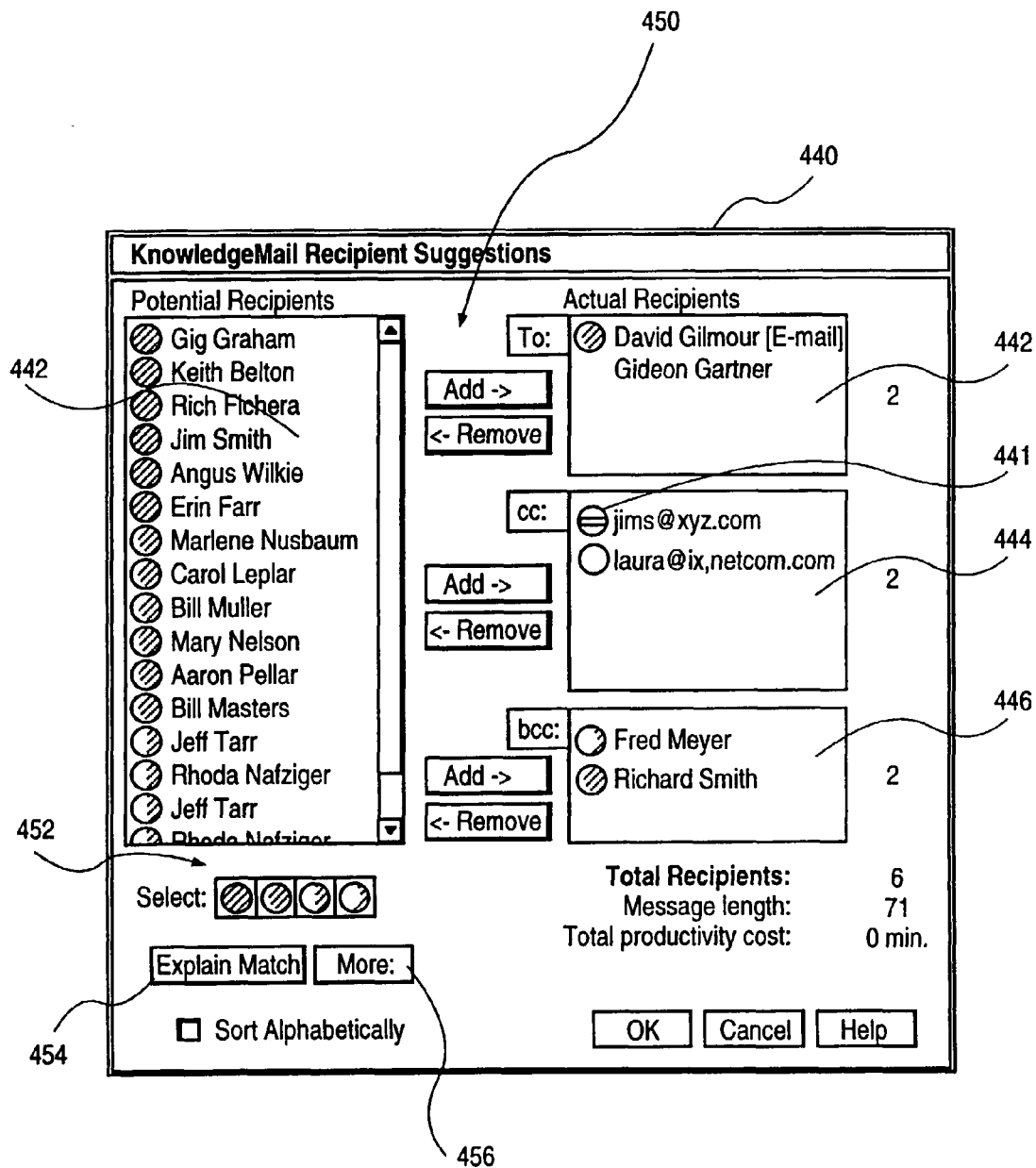
FIG. 18D illustrates a user dialog, according to an exemplary embodiment of the present invention, through which a list of potential recipients is displayed to an addressor of an e-mail message.

At block 410, the author of the electronic document is presented with a list of potential recipients by the e-mail client 18, and specifically by the addressing system 84 via a user dialog 440 as shown in FIG. 18D. FIG. 18D groups matching levels into matching classes each characterized by a visual representation (icon).

The user dialog 440 shown in FIG. 18D presents the list of potential recipients in a "potential recipients" scrolling window 442, wherein the names of potential recipients are grouped into levels or ranked classes according to the strength of the matching metric. An icon is also associated with each user name, and provides an indication of the strength of the recommendation of the relevant potential recipients. Merely for example, a fully shaded circle may indicate a high recommendation, with various degrees of "blackening" or darkening of a circle indicating lesser degrees of recommendation. A "rejection" icon may be associated with an actual recipient, and an example of such a "rejection" icon is indicated at 441. The "rejection" icon indicates a negative recommendation on an actual recipient supplied by the author of the message, and may be provided in response to a user manually modifying his or her profile to designate certain terms therein as generating such a "rejection" status for a recipient against which a hit occurs.

The user dialog 440 also presents a list of actual (or confirmed) recipients in three windows, namely a "to:" window 442, a "cc:" window 444 and a "bcc:" window 446. An inquiring user may move recipients between the potential recipients list and the actual recipients lists utilizing the "Add" and "Remove" buttons indicated at 450. The user dialog 440 also includes an array of "select" buttons 452, utilizing which a user can determine the recommendation group to be displayed within the scrolling window 442. The user dialog 440 finally also includes "Explained Match" and "More" buttons 454 and 456, the purposes of which is elaborated upon below. As shown in FIG. 18D, the author user may select an "Explain" function for any of the proposed recipients utilizing the "Explain Match" button 454. If it is determined at decision box 412 that this "Explain" function has been selected, the method 400 branches to block 414, as illustrated in FIG. 18B. Specifically, at block 414, the addressing system 84 propagates a further "Explain" query to the knowledge access server 26 utilizing HTTP, and opens a browser window within which to display the results of the query. At block 416, the knowledge access server 26 retrieves the terms (i.e., the knowledge terms) that constituted the basis for the match, as well as associated confidence level values. This information is retrieved from the public portion of the relevant user knowledge profile in the knowledge repository 50. At block 418, the information retrieved at block 416 is propagated to the client 18 from the knowledge access server 26 via the web server 20. The information is then displayed within the browser window opened by the e-mail client 18 at block 414. Accordingly, the author user is thus able to ascertain the reason for the proposal of a potential recipient by the addressing system 84, and to make a more informed decision as to whether the proposed recipient should be included within the actual recipients (confirmed addressee) list.

The user also has the option of initiating a "More" function by selecting the "More" button 456 on the user dialog 440, this function serving to provide the user with additional proposed recipients. Accordingly, a determination is made at block 422 as to whether the "More" function has been selected by the author user. If so, the method 400 branches to block 424 as shown in FIG. 18C, where the client 18 propagates a "More" request to the knowledge access server 20 in the same manner as the "Explain" query was propagated to the knowledge access server at block 414. At block 46, the knowledge access server 26 identifies further potential recipients, for example, by using a threshold value for the "matching metric" that is lower than a threshold value utilized as a cutoff during the initial information retrieval operation performed at blocks 406 and 408. At block 428, the knowledge access server 26 then transmits the list of further potential recipients, and associated information, to the e-mail client 18. At block 430, the list of additional potential recipients is presented to the author user for selection in descending order according to the "matching metric" associated with each of the potential recipients.

At block 432, the user then adds at his or her option, or deletes selected potential or "rejected" recipients to the list of actual recipients identified in "to:", "cc:" or "bcc:" lists of the e-mail, thus altering the status of the potential recipients to actual recipients. At block 434, the e-mail message is then transmitted to the confirmed addressees.

If the user profile includes a "rejection" status on a term (something a user can do through manual modification of the profile), then a special symbol, such as that indicated 441 in FIG. 18D, may be returned indicating a negative recommendation on a recipient supplied by the author of the message.

The exemplary method 400 discussed above is advantageous in that the knowledge access server 26 automatically provides the author user with a list of potential addressees, based on a matching between document terms identified within the message body of an e-mail and knowledge terms included within user profiles.

Case Control

Figure 19:
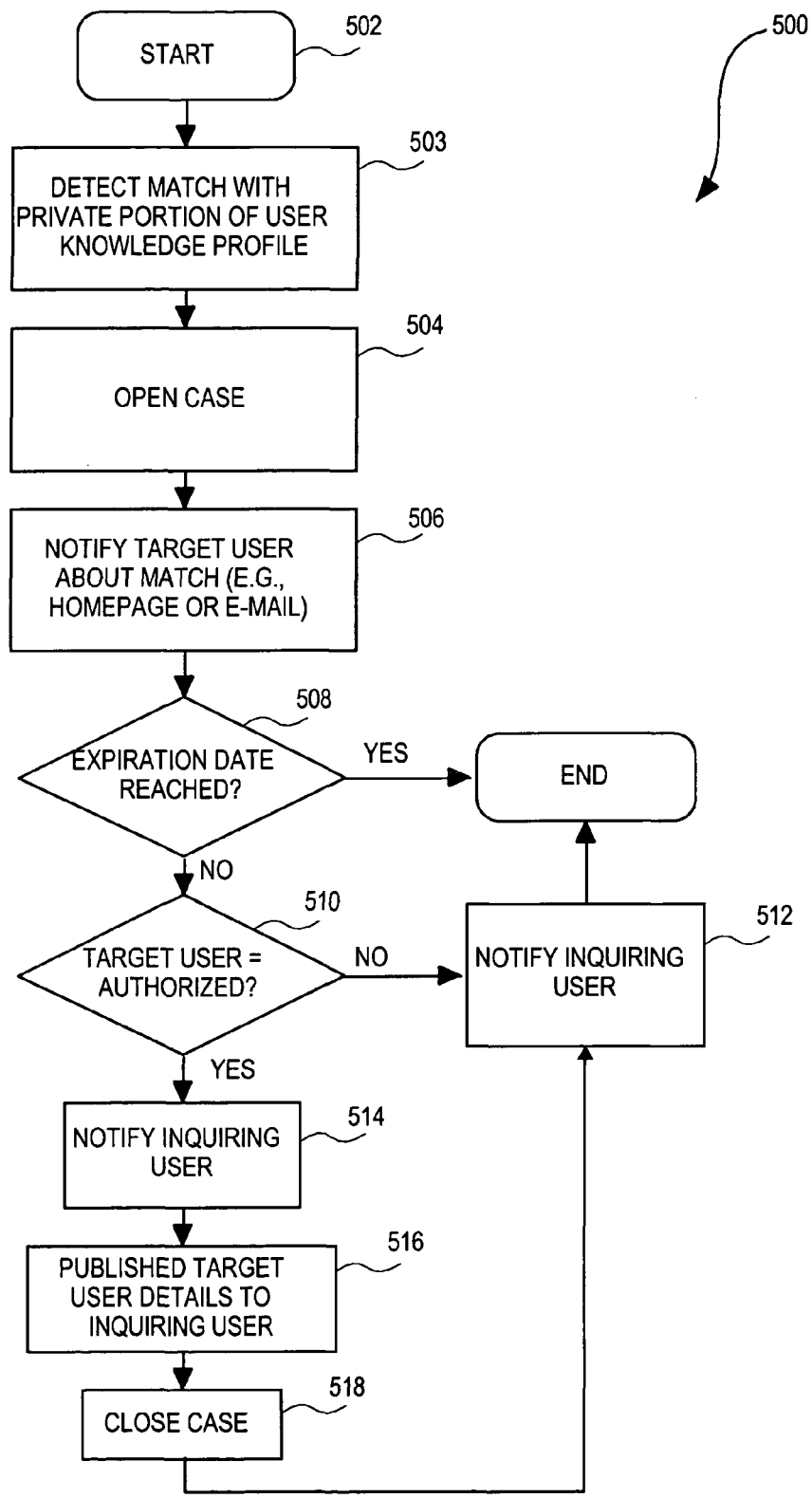
FIG. 19 is a flowchart illustrating a method, according to an exemplary embodiment of the present invention, of managing user authorization to publish, or permit access to, a user knowledge profile.

FIG. 19 is a flow chart illustrating a method 500, according to one exemplary embodiment of the present invention, of managing user authorization to publish, or permit access to, a user knowledge profile. The method 500 is executed by the case controller 45A that tracks open "cases" and initiates notification to users concerning the status of such cases. For the purposes of the present specification, the term "case" may be taken to refer to a user authorization process for publication of, or access to, a user knowledge profile. The method 500 commences at block 502, and then proceeds to block 503, where a match is detected with a private portion of a user knowledge profile. At block 504, the case controller 45A then opens a case, and notifies the target user at block 506 concerning the "hits" or matches between a document (or query) term and a knowledge term in a knowledge user profile. This notification may be by way of an e-mail message, or by way of publication of information on a Web page accessed by the user. At block 508, the case controller 45A determines whether an expiration date, by which the target user is required to respond to the hit, has been reached or in fact passed. If the expiration date has passed, the case controller 45A closes the case and the method 500 terminates. Alternatively, a determination is made at decision box 510 as to whether the target user has responded to the notification by authorizing publication of, or access to, his or her user knowledge profile based on the hit on the private portion thereof. If the target user has not authorized such action (i.e., declined authorization), an inquiring user (e.g., the author user of an e-mail or a user performing a manual database search to locate an expert) is notified of the decline at block 512. Alternatively, should the target user have authorized publication or access, the inquiring user is similarly notified of the authorization at block 514. The notification of the inquiring user at blocks 512 or 514 may be performed by transmitting an e-mail to the inquiring user, or by providing a suitable indication on a web page (e.g., a home page or search/query web page) accessed by the inquiring user. At block 516, the appropriate portions of the user profile pertaining to the target user are published to the inquiring user, or the inquiring user is otherwise permitted access to the user profile. At block 518, the case controller 45A then closes the case, whereafter the method terminates.

Supplemental Method of Identifying Confidence Value

FIGS. 7-9 describe an exemplary method 140 of identifying knowledge terms and calculating associated confidence level values. A supplemental method 550, according to an exemplary embodiment of the present invention, of assigning a confidence value to a term will now be described with reference to FIGS. 20-22. The supplemental method 550 seeks to compensate for a low confidence level value which may be associated with the term as a result of the term not appearing in any recent documents associated with a user. It will be appreciated that by calculating a confidence level value utilizing the method illustrated in FIG. 9, aged terms (i.e., terms which have not appeared in recent documents) may be attributed a low confidence level value even though they may be highly descriptive of a specialization or knowledge of a user. The situation may occur where a user is particularly active with respect to a particular topic for a short period of time, and then re-focuses attention on another topic. Over time, the methodology illustrated in FIG. 9 may too rapidly lower the confidence level values associated with terms indicating user knowledge.

Figure 20:
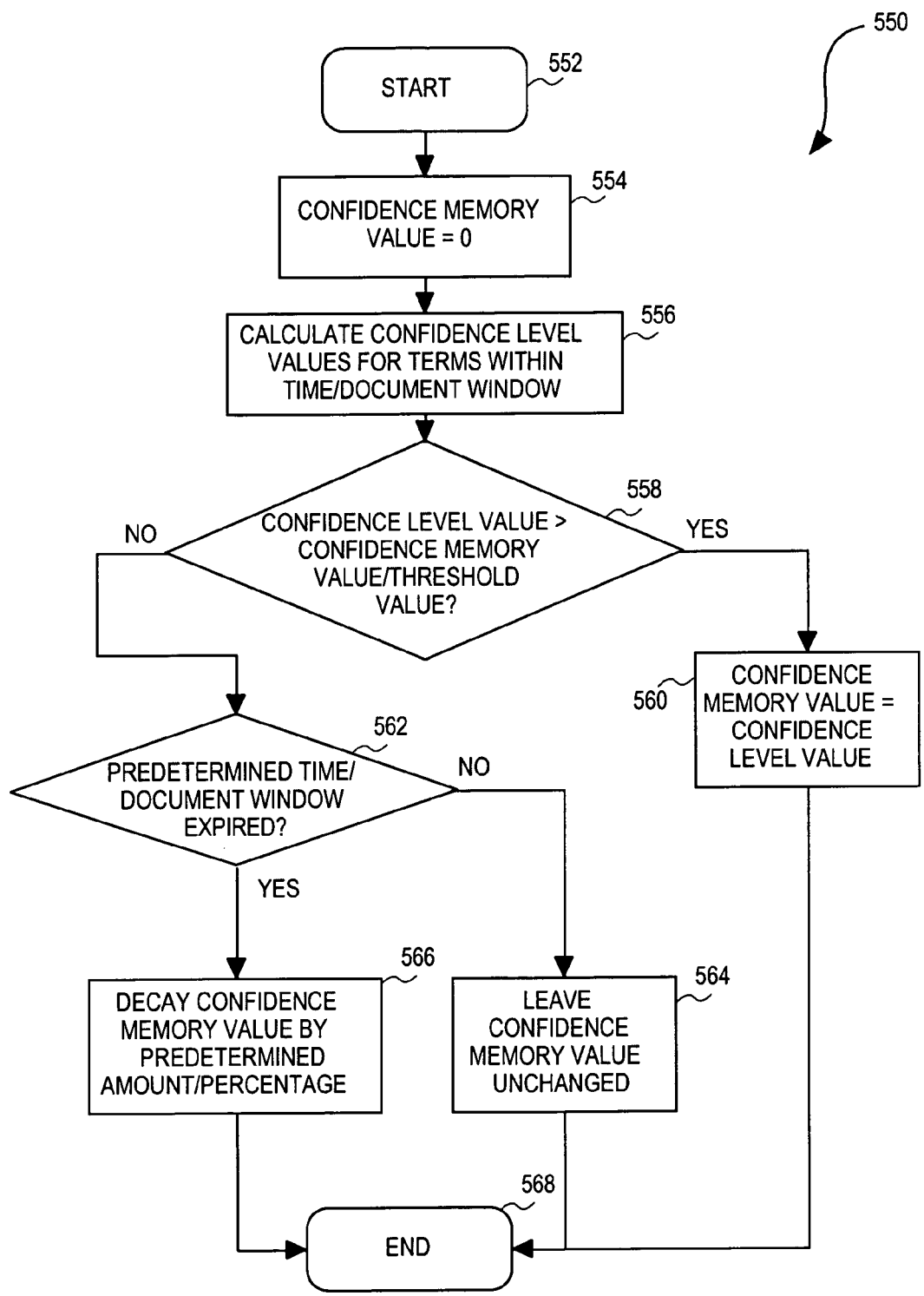
FIG. 20 is a flowchart illustrating a method, according to an exemplary embodiment of the present invention, of assigning a confidence value, either in the form of a confidence level value or a confidence memory value, to a term.

Referring to FIG. 20, there is illustrated the exemplary method 550 of assigning a confidence value to a term. The method 550 commences at block 552, whereafter an initial confidence memory value (as distinct from a confidence level value) is assigned a zero (0) value. At block 556, a confidence level value for a term is calculated utilizing, for example, the method 154 illustrates in FIG. 9. However, this confidence level value is only calculated for occurrences of the relevant term within a particular time or document window. For example, in summing the adjusted count values at block 190 within the method 154, the adjusted count values for only documents received within a predetermined time (e.g., the past 30 days), or only for a predetermined number of documents (e.g., the last 30 documents) are utilized to calculate the summed adjusted count value. It will be appreciated that by discarding documents, which occurred before the time or document window, the effect on the confidence level values for aged terms by the absence of such aged terms within recent documents may be reduced.

At decision box 558, a determination is then made as to whether a newly calculated confidence level value for a term is greater than a previously recorded confidence memory value, or alternatively greater than a predetermined site-wide or system-wide threshold value. If the confidence level value is determined to be greater than the confidence memory value (or the threshold value), the confidence memory value is then made equal to the confidence level value by overwriting the previous confidence memory value with the newly calculated confidence level value at box 560. In this way, it is ensured that the confidence level value does not exceed the confidence memory value.

FIG. 22 is an exemplary user-term table 112, according to one embodiment of the present invention, that is shown to include a confidence level column 118, a confidence memory value column 121, and a time stamp column 123. The table 122 records a confidence level value and a confidence memory value for each user-term pairing within the table 112, and it is to this table that the confidence level values and the confidence memory values are written by the method 550. The time stamp column 123 records a date and time stamp value indicative of the date and time at which the corresponding confidence memory value was last updated. This value will accordingly be updated upon the overwriting of the confidence memory value at block 560.

Should the confidence level value not exceed the confidence memory value or the threshold value, as determined at decision box 558, the method 550 then proceeds to decision box 562, where a further determination is made as to whether another time or document window, associated with a block of decaying the confidence memory value, has expired. If not, the confidence memory value is left unchanged at block 564. Alternatively, if the time or document window associated with the decay block has expired, the confidence memory value is decayed by a predetermined value or percentage at block 566. For example, the confidence memory value may be decayed by five (5) percent per month. The time stamp value may be utilized to determine the window associated with the decay block. The time stamp value associated with the decayed confidence memory value is also updated at block 566. The method 550 then terminates at block 568.

Figure 21:
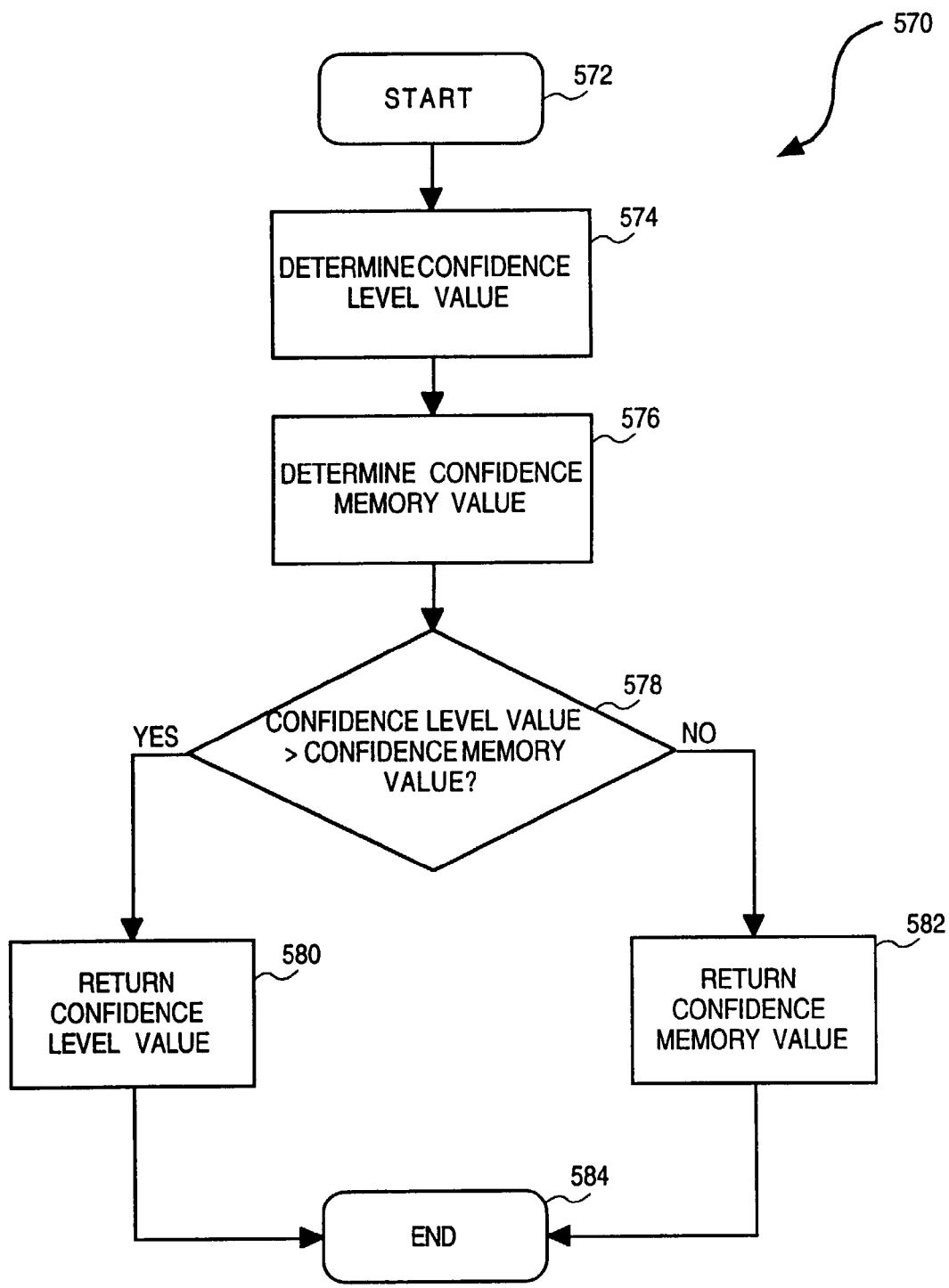
FIG. 21 is a flowchart illustrating a method, according to an exemplary embodiment of the present invention, of determining or identifying a confidence value, either in the form of a confidence level value or a confidence memory value, for a term.

FIG. 21 is a flowchart illustrating an exemplary method 570, according to one embodiment of the present invention, of determining or identifying a confidence value (e.g., either a confidence level value or a confidence memory value) for a term. The method 570 may be executed in performance of any of the blocks described in the preceding flow charts that require the identification of a confidence level value for a term in response to a hit on the term by a document term (e.g., in an electronic document or other query). The method 570 commences at block 572, and proceeds to block 574, where a confidence level value for a term within a user profile is identified. For example, the confidence level value may be identified within be user-term table 112 illustrated in FIG. 22. At block 576, a confidence memory value for the term may then also be identified, again by referencing the user-term table 112 illustrated in FIG. 22. At decision box 578, a determination is then made as to whether the confidence level value is greater than the confidence memory value. If the confidence level value is greater than the confidence memory value, the confidence level value is returned, at block 580, as the confidence value. Alternatively, should the confidence memory value be greater than the confidence level value, the confidence memory value is returned, at block 582, as the confidence value. The method 570 then terminates at block 584.

Accordingly, by controlling the rate at which a confidence value for a term is lowered or decayed, the present invention seeks to prevent having a potentially relevant term ignored or overlooked.

Computer System

Figure 23:
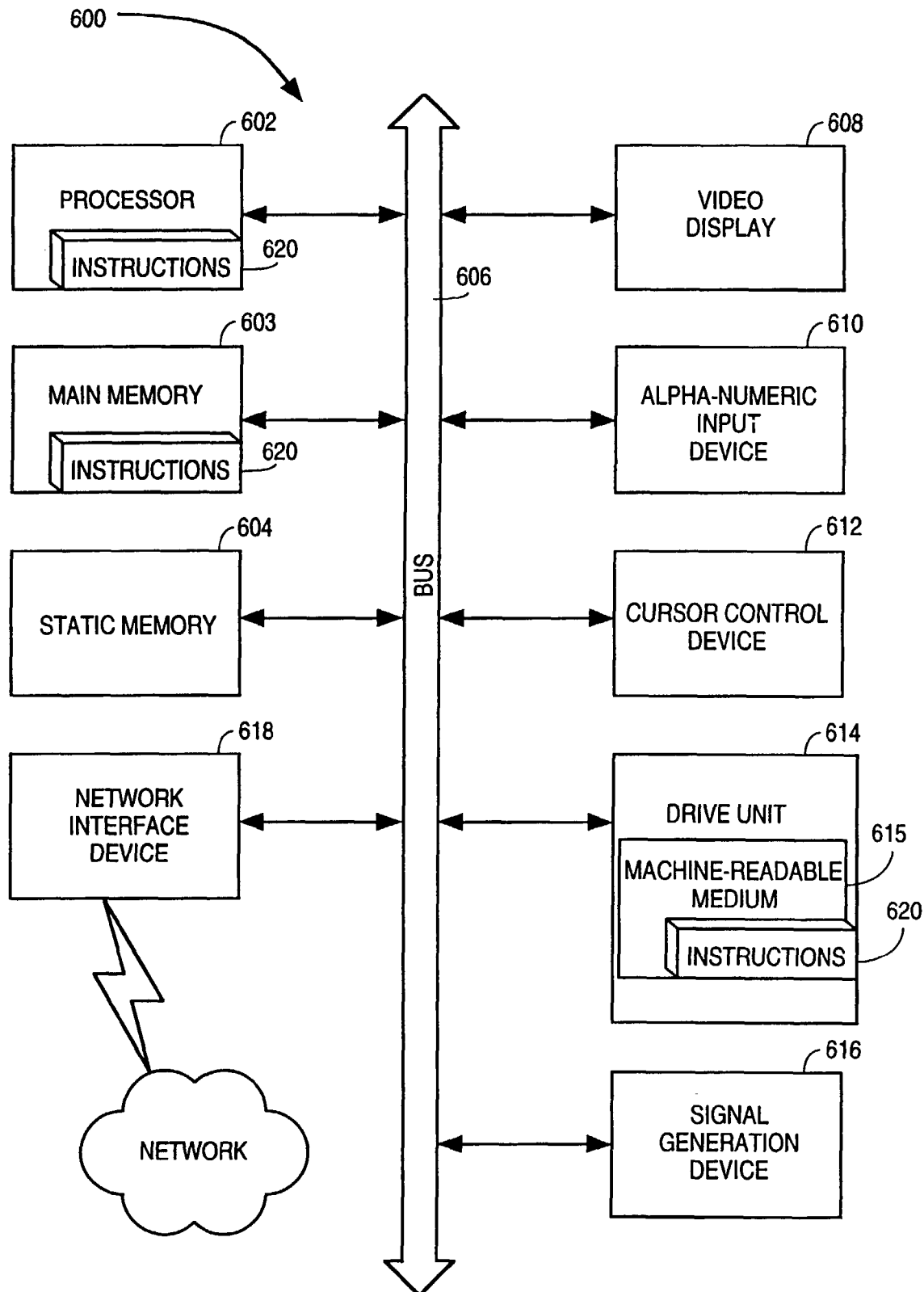
FIG. 23 is a block diagram illustrating a machine, according to one exemplary embodiment, within which software in the form of a series of machine-readable instructions, for performing any one of the methods discussed above, may be executed.

FIG. 23 is a diagrammatic representation of a machine in the form of computer system 600 within which software, in the form of a series of machine-readable instructions, for performing any one of the methods discussed above may be executed. The computer system 600 includes a processor 602, a main memory 603 and a static memory 604, which communicate via a bus 606. The computer system 600 is further shown to include a video display unit 608 (e.g., a liquid crystal display (LCD) or a cathode ray tube (CRT)). The computer system 600 also includes an alphanumeric input device 610 (e.g., a keyboard), a cursor control device 612 (e.g., a mouse), a disk drive unit 614, a signal generation device 616 (e.g., a speaker) and a network interface device 618. The disk drive unit 614 accommodates a machine-readable medium 615 on which software 620 embodying any one of the methods described above is stored. The software 620 is shown to also reside, completely or at least partially, within the main memory 603 and/or within the processor 602. The software 620 may furthermore be transmitted or received by the network interface device 618. For the purposes of the present specification, the term "machine-readable medium" shall be taken to include any medium that is capable of storing or encoding a sequence of instructions for execution by a machine, such as the computer system 600, and that causes the machine to performing the methods of the present invention. The term "machine-readable medium" shall be taken to include, but not be limited to, solid-state memories, optical and magnetic disks, and carrier wave signals.

Thus, a method and apparatus for constructing and maintaining a user knowledge profile have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method, comprising:
    intercepting, by the computer, emails sent by a first entity while the emails are being transmitted on a network;
    automatically constructing, by the computer, a knowledge profile of the first entity based on a plurality of sets of text from the intercepted emails;
    storing, by the computer, the knowledge profile as part of a knowledge base stored in a machine-accessible storage facility;
    in response to preparation of a particular email to be sent by a second entity to at least one other entity of the network, identifying, by the computer, prior to sending the particular email by the second entity, one or more suggested potential recipients as meeting one or more criteria based at least in part on a comparison of the knowledge profile of the one or more suggested potential recipients and text contained in the particular email to be sent by the second entity;
    outputting, by the computer, a recommendation to include at least a first entity as a recipient of the particular email to be sent by the second entity, the first entity meeting the one or more criteria and being one of the one or more suggested potential recipients; and
    providing, by the computer, a matching metric indicative of a relative strength of the recommendation for the one or more suggested potential recipients, the matching metric comprises a sum of confidence level values associated with the one or more suggested potential recipients.

2. The method as recited in claim 1, wherein the knowledge profile is representative of an information focus of the first entity.

3. The method as recited in claim 1, wherein the knowledge profile is representative of knowledge possessed by the first entity.

4. The method as recited in claim 1, wherein operating processing system to identify the first entity as meeting one or more criteria is done without reliance upon any predefined association between the first entity and the second entity.

5. The method as recited in claim 1, wherein the plurality of sets of text have been authored by the first entity.

6. The method as recited in claim 1, wherein the knowledge profile comprises a first portion and a second portion, and the first portion and the second portion have different access restrictions.

7. The computer-implemented method as recited in claim 6, wherein the first portion comprises a public portion including public information and the second portion comprises a private portion including private information.

8. The computer-implemented method as recited in claim 7, wherein the recommendation includes only information of the public portion of the knowledge profile of the first entity.

9. The computer-implemented method as recited in claim 7, wherein the recommendation includes information of the private portion of the knowledge profile of the first entity based at least in part on authorization, by the first entity, to publish the information of the private portion of the knowledge profile with the recommendation.

10. The method as recited in claim 1, wherein one of the emails includes an attached file.

11. A system, comprising:
    a memory;
    a management server to intercept emails while the emails are being transmitted on a network by a first user and to automatically construct a knowledge profile of the first user based on a plurality of sets of text from the intercepted emails, the management server further to store the knowledge profile in a database in the memory; and
    an access server to identify, prior to sending a particular email by a second user, one or more suggested potential recipients as meeting one or more criteria in response to preparation of the particular email to be sent by the second user and intended for at least one other user of the network, without reliance upon any user-defined association between the first user and the second user, by at least comparing the knowledge profile of the one or more suggested potential recipients with text contained in the particular email intended for the at least one other user, the access server further to recommend to include at least the first user as a recipient of the particular email to be sent by the second user, the first user meeting the one or more criteria and being one of the one or more suggested potential recipients, without reliance upon any user-defined association between the first user and the second user, the access server further to provide a matching metric indicative of a relative strength of the recommendation for the one or more suggested potential recipients, the matching metric comprises a sum of confidence level values associated with the one or more suggested potential recipients.

12. The system as recited in claim 11, wherein the knowledge profile is representative of an information focus of the first user.

13. The system as recited in claim 11, wherein the knowledge profile is representative of knowledge possessed by the first user.

14. The system as recited in claim 11, wherein the knowledge profile comprises a public portion and a private portion.

15. The system as recited in claim 11, wherein one of the emails includes an attached file.

16. A processing system, comprising:
a processor; and
a memory coupled with the processor and storing instructions which, when executed by the processor, cause the processing system to perform a process that includes:
intercepting emails sent by a first entity while the emails are being transmitted on a network;
automatically constructing a knowledge profile of the first entity based on a plurality of sets of text from the intercepted emails;
storing the knowledge profile as part of a knowledge base stored in a machine-accessible storage facility;
in response to preparation of a particular email prepared by a second entity and intended for at least one other entity, identifying, prior to sending the particular email by the second entity, one or more suggested potential recipients as meeting one or more criteria based at least in part on a comparison of the knowledge profile of the one or more suggested potential recipients and text contained in the particular email prepared by the second entity;
outputting a recommendation to include at least a first entity as a recipient of the particular email prepared by the second entity, the first entity meeting the one or more criteria and being one of the one or more suggested potential recipients; and providing a matching metric indicative of a relative strength of the recommendation for the one or more suggested potential recipients, the matching metric comprises a sum of confidence level values associated with the one or more suggested potential recipients.

17. The processing system as recited in claim 16, the memory further storing instructions which, when executed by the processor, cause the processing system to:
in response to identifying that the first entity meets the one or more criteria, indicate to the second entity that the first entity meets the one or more criteria.

18. The processing system as recited in claim 16, wherein the knowledge profile is representative of an information focus of the first entity.

19. The processing system as recited in claim 16, wherein the knowledge profile is representative of knowledge possessed by the first entity.

20. The processing system as recited in claim 16, wherein identifying the first entity as meeting one or more criteria is done without reliance upon any predefined association between the first entity and the second entity.

21. The processing system as recited in claim 16, wherein the plurality of sets of text have been authored by the first entity.

22. The processing system as recited in claim 16, the memory further storing instructions which, when executed by the processor, cause the processing system to:
prompt the first entity for authorization to publish at least a portion of the knowledge profile to the second entity, in response to determining that an association exists between search query and the knowledge profile of the first entity.

23. The processing system as recited in claim 16, wherein the knowledge profile comprises a first portion and a second portion, and the first portion and the second portion have different access restrictions.

24. The processing system as recited in claim 16, wherein one of the emails includes an attached file.

* * * * *

UNITED STATES PATENT AND TRADEMARK OFFICE
CERTIFICATE OF CORRECTION

PATENT NO. : 8,543,649 B2  
APPLICATION NO. : 10/135254  
DATED : September 24, 2013  
INVENTOR(S) : Gilmour et al.

Page 1 of 1

It is certified that error appears in the above-identified patent and that said Letters Patent is hereby corrected as shown below:

On title page, column 1, item [74] under Attorney, Agent, or Firm, line 6-7, delete "Kilpatrick, Townsend & Stockton" and insert -- Kilpatrick, Townsend & Stockton LLP --, therefor.

On title page 3, column 2, References Cited under Other Publications, line 12, delete "CMP.not" and insert -- CMP.net --, therefor.

On title page 3, column 2, References Cited under Other Publications, line 13, delete "not" and insert -- net --, therefor.

On title page 3, column 2, References Cited under Other Publications, line 20, delete "Malse," and insert -- Maise, --, therefor.

On title page 3, column 2, References Cited under Other Publications, line 29, delete "Inter@active" and insert -- Inter@ctive --, therefor.

In the Specification

In column 14, line 16-17, delete "and or" and insert -- and/or --, therefor.

In column 21, line 20, delete "example" and insert -- example, --, therefor.

Signed and Sealed this  
Twenty-fifth Day of February, 2014

Michelle K. Lee  
*Deputy Director of the United States Patent and Trademark Office*